(12) United States Patent
Kamiguchi et al.

(10) Patent No.: US 6,278,075 B1
(45) Date of Patent: Aug. 21, 2001

(54) CONTROLLER OF WIRE ELECTRIC DISCHARGE MACHINE

(75) Inventors: Masao Kamiguchi, Yamanashi; Masaki Kurihara, Tokyo; Kaoru Hiraga, Yamanashi, all of (JP)

(73) Assignee: Fanuc, Ltd., Yamanashi (JP)

( * ) Notice: Subject to any disclaimer, the term of this patent is extended or adjusted under 35 U.S.C. 154(b) by 0 days.

(21) Appl. No.: 09/244,861

(22) Filed: Feb. 5, 1999

(30) Foreign Application Priority Data

Feb. 5, 1998 (JP) ................................................. 10-037942
Jun. 4, 1998 (JP) ................................................. 10-170511

(51) Int. Cl.[7] ............................... B23H 1/00; B23H 7/02; B23H 7/20
(52) U.S. Cl. ......................................................... 219/69.12
(58) Field of Search ............................. 219/69.12, 69.13; 700/162

(56) References Cited

U.S. PATENT DOCUMENTS

| | | | | |
|---|---|---|---|---|
| 4,392,041 | * | 7/1983 | Yatomi et al. ..................... | 219/69.12 |
| 4,559,434 | * | 12/1985 | Kinoshita .......................... | 219/69.12 |
| 5,243,166 | * | 9/1993 | Nakayama ......................... | 219/69.12 |
| 5,362,936 | * | 11/1994 | Ishibashi et al. .................. | 219/69.12 |

FOREIGN PATENT DOCUMENTS

| | | | |
|---|---|---|---|
| 58-66623 | * | 4/1983 | (JP) . |
| 60-073326 | | 4/1985 | (JP) . |
| 62-237335 | | 10/1987 | (JP) . |
| 1-257516 | * | 10/1989 | (JP) . |
| 05149811 | | 6/1993 | (JP) . |
| 6-8054 | * | 1/1994 | (JP) . |
| 7-204942 | | 8/1995 | (JP) . |
| 8-90342 | | 4/1996 | (JP) . |
| 9-290328 | | 11/1997 | (JP) . |
| 10-29117 | | 2/1998 | (JP) . |

* cited by examiner

Primary Examiner—Geoffrey S. Evans
(74) Attorney, Agent, or Firm—Staas & Halsey LLP

(57) ABSTRACT

A controller of a wire electric discharge machine monitoring a change in thickness of a workpiece and a current density in real time, promoting a machining speed by preventing occurrence of disconnection of a wire electrode even when the change in the thickness is caused in the workpiece and improving a dispersion in a machining enlargement amount. A machining distance calculating device outputs a signal at each progress of machining by a predetermined distance $\Delta x$. A main pulse number storing device counts a main pulse number for discharge machining outputted from a main pulse generator during a time period of the signal. A thickness calculating device calculates the thickness from a reference main pulse number in machining a reference thickness, the main pulse number stored to the main pulse number storing device and the reference thickness at each reception of the signal. The calculated thickness, further, a machining current, the machining speed and a machining current density are displayed. A discharge pause time control device changes a pause time period of voltage applied to the wire electrode and the workpiece in accordance with a thickness change rate and adjusts the machining current density such that no change is caused before and after the change in the thickness.

24 Claims, 22 Drawing Sheets

| Hs | | | |
|---|---|---|---|
| Ps | | | |
| P1 | V1 | t1 | I1 |
| P2 | V2 | t2 | I2 |
| P3 | V3 | t3 | I3 |
| P4 | V4 | t4 | I4 |
| ⋮ | ⋮ | ⋮ | ⋮ |
| Pi | Vi | ti | Ii |
| ⋮ | ⋮ | ⋮ | ⋮ |
| Pn | Vn | tn | In |

MACHINING ELAPSE TIME (5 MIN./DIV.)
A: AVERAGE MACHINING VOLTAGE
B: AVERAGE MACHINING CURRENT
C: THICKNESS CHANGE

MACHINING ELAPSE TIME (5 MIN./DIV.)
A: AVERAGE MACHINING VOLTAGE
B: AVERAGE MACHINING CURRENT
C: THICKNESS CHANGE

A: AVERAGE MACHINING VOLTAGE
B: AVERAGE MACHINING CURRENT
C: THICKNESS CHANGE

A: AVERAGE MACHINING VOLTAGE
B: AVERAGE MACHINING CURRENT
C: THICKNESS CHANGE

PORTION A   PORTION B   PORTION C

A: AVERAGE MACHINE VOLTAGE
B: AVERAGE MACHINE CURRENT
C: THICKNESS CHANGE

| MEASURING PORTION | CONVENTIONAL MACHINING | CURRENT CONTROL BY THICKNESS CHANGE |
|---|---|---|
| | GROOVE WIDTH (mm) | GROOVE WIDTH (mm) |
| PORTION A | 0.055 | 0.058 |
| PORTION B | 0.063 | 0.058 |
| PORTION C | 0.070 | 0.059 |
| DIFFERENCE | 0.015 | 0.001 |

CONTROLLER OF WIRE ELECTRIC DISCHARGE MACHINE

BACKGROUND OF THE INVENTION

1. Field of the Invention

The present invention relates to an improvement in a wire electric discharge machine, and particularly to a controller of a wire electric discharge machine capable of monitoring a change in thickness of a workpiece and a change in machining current density and also improving a machining performance on a workpiece having a change in thickness.

2. Description of the Related Art

FIG. 28 shows an outline of a conventional wire electric discharge machine. A main pulse generator 1 is constituted by a direct current power source, a circuit comprising switching elements such as transistors and a circuit charging and discharging a capacitor for applying voltage to a gap between a wire electrode 4 and a workpiece 5 to carry out electric discharge machining. A detection voltage generator 2 is constituted by a circuit comprising active elements such as transistors, resistors and capacitors and a direct current power source for applying pulse voltage (voltage lower than main pulse voltage) between the wire electrode 4 and the workpiece 5 for detecting whether the gap between the wire electrode 4 and the workpiece 5 is dischargeable.

Conductive brushes 3 are for conducting electricity to the wire electrode 4 and connected to terminals of the main pulse generator 1 and the detection voltage generator 2 on one side. Further, the workpiece 5 is connected to terminals of the main pulse generator 1 and the detection voltage generator 2 on other side and pulse voltage is applied from the main pulse generator 1 or the detection voltage generator 2 between the traveling wire electrode 4 and the workpiece 5.

A discharge gap detecting device 6 is connected to the workpiece 5 and the wire electrode 4, determines whether discharge gap is brought into a dischargeable state based on lowering of the detection pulse voltage and outputs a signal for servo feed to a feed pulse calculating device 7 by the detected voltage changed by a change in the discharge gap. The feed pulse calculating device 7 produces a series of pulses a feed pulse interval of which is normally controlled such that gap average voltage becomes constant to optimize repetition of discharge based on the signal for servo feed and outputs the series of pulses to a feed pulse distributing device 8. The feed pulse distributing device 8 distributes the series of pulses to the drive pulses of X-axis and Y-axis based on a machining program and outputs the drive pulses to an X-axis motor control device 9 and a Y-axis motor control device 10 for driving a table mounted with the workpiece 5.

Further, according to a conventional wire electric discharge machine shown by FIG. 29, a current detecting circuit 11 detects main pulse current and outputs an average machining current value in a predetermined time period. A display device 12 displays the average machining current outputted from the current detecting circuit 11, average machining voltage outputted from the discharge gap detecting device 6 and feed speed outputted from the feed pulse calculating device 7, respectively, by receiving data of numeral values or levels.

First, in order to detect whether electricity can be discharged between the workpiece 5 and the wire electrode 4, detection pulse voltage is generated from the detection voltage generator 2 and is applied to the gap between the workpiece 5 and the wire electrode 4. When electricity conduction is caused between the workpiece 5 and the wire electrode 4 and voltage drop is caused between the workpiece 5 and the wire electrode 4, the discharge gap detecting device 6 detects the voltage drop, determines that electricity can be discharged, transmits a main pulse applying signal to the main pulse generator 1 to thereby generate a main pulse from the main pulse generator 1 and flows main pulse current (discharge machining current) to the gap between the workpiece 5 and the wire electrode 4. Thereafter, the discharge gap detecting device 6 applies again a detection pulse to the gap after elapse of a pertinent pause time period for cooling the gap. The discharge machining is carried out by repeatedly executing the operational cycle.

In respect of a situation of repeated discharge the feed pulse calculating device 7 produces a series of pulses the feed pulse interval of which is normally controlled such that average voltage of the gap becomes constant in order to optimize repetition of discharge at the gap by the discharge gap detecting device 6 and the feed pulse calculating device 7. The feed pulse distributing device 8 distributes the series of pulses into drive pulses of X-axis and Y-axis based on a machining program, outputs the drive pulses respectively to the X-axis motor control device 9 and the Y-axis motor control device 10, drives a table mounted with the workpiece 5 and carries out machining instructed by the machining program on the workpiece 5.

Further, according to the conventional wire electric discharge machine shown by FIG. 29, the average machining current detected by the current detecting circuit 11, the average machining voltage detected by the discharge gap detecting device 6 and the feed speed calculated by the feed pulse calculating device 7, are displayed on the display device 12 to thereby indicate a state in machining.

FIG. 11 shows monitor waveforms of the average machining voltage and the average machining current when the workpiece 5 having a section shown by FIG. 10 is sliced by a conventional controller of a wire electric discharge machine mentioned above. Further, FIG. 23 shows monitor waveforms of the average machining voltage and the average machining current when the workpiece 5 having a section shown by FIG. 22 is sliced by the conventional controller of a wire electric discharge machine mentioned above.

Although the plate thickness of the workpiece 5 is varied, as shown by FIG. 11 and FIG. 23, in respect of a change in the plate thickness, the average machining voltage remains substantially constant as a whole. Similarly, the average machining current also remains substantially constant.

Normally, when the plate thickness of the workpiece 5 is changed, disconnection of the wire electrode 4 is frequently caused immediately after machining is particularly shifted from a thick portion to a thin portion. Cause therefor seems to be that pulse current is liable to concentrate at one location at a portion having a thin plate thickness. Therefore, conventionally, in order to avoid pulse current from being concentrated on a portion having a thin plate thickness, machining is carried out by modifying a machining condition to that in conformity with the portion having a thin plate thickness from start of machining such that proper average machining current is produced. This operation gives rise to a considerable drop in the machining speed.

When a change in the plate thickness is previously known and when, for example, an operation of reducing machining current in the case of a thin plate thickness and increasing the current in the case of a thick plate thickness can be carried out, the machining time period can be shortened by that amount. Conventionally, as a method of adjusting machining current by finding a change in a plate thickness, there has been devised a method in which thickness information is read from the drawings, a machining program is fabricated by including information of increasing or decreasing machining current and the information is instructed or displayed in machining. However, the thickness information is not necessarily constituted ordinarily to directly provide from dimensions of the drawings. Therefore, in constituting a machining program, the thickness information needs to particularly calculate and the thickness information needs to instruct previously. Otherwise, in carrying out cutting as in a cut model or wire electric discharge machining after coarsely constituting a workpiece already by machining, although the thickness information may particularly be calculated and instructed previously, such an operation per se is very difficult.

Discharge in electric discharge machining is started by searching a very small conductive path such that a gap formed between an electrode and a workpiece opposed thereto becomes several tens $\mu$m or less by a detection pulse or the like, thereafter flowing main pulse current and vaporizing or melting to scatter the very small conductive path or very small portions of the electrode and the workpiece in contact therewith forcibly by thermal energy produced there. Further, a series of the discharge machining cycle is finished by pause of current and a cooling action of a machining fluid.

The degree of evaporation or melting to scatter at the both very small portions is determined by the magnitude of a peak value of the main pulse current having steep rise, thermally related properties of materials of the electrode and the workpiece such as melting heat or thermal conductivity and machining environmental properties such as properties related to cooling of an insulating fluid such as latent heat of evaporation or viscosity.

When the plate thickness of the workpiece mentioned above is thin, a time period until generation of successive discharge at a vicinity of a discharge portion is shorter than that when the plate thickness is thick and accordingly, successive main pulse current is applied before sufficiently cooling the portion. Accordingly, depending on the machining environmental properties mentioned above, heat is concentrated while the discharge portion remains uncooled. Further, there emerges a state in which a molten state still remains when successive main pulse is applied. In such a situation, the very small portions of the electrode and the workpiece cannot be evaporated or melted to scatter, the machining efficiency is extremely deteriorated and a state in which the discharge machining can no more be carried out is brought about. When the main pulse is applied further even under the situation, the wire constituting the electrode is heated and destructed and finally reaches disconnection by being unable to withstand the tensile strength of the wire when the wire is travelling.

Meanwhile, when the plate thickness differs, a number of repetition of discharge caused in progressing a constant distance also differs. Therefore, an effect of enlarging the gap between the wire electrode and the workpiece caused by secondary discharge via sludge becomes significant to thereby cause a problem in which an amount of enlarging in machining portions of the workpiece having different plate thicknesses is not constant.

In this way, there poses a problem in which when the machining speed in intended to increase, there is a limit in energy capable of being applied to machining by an environment of machining such as a material or a plate thickness of the workpiece and the amount of enlarging machining at portions of the workpiece having different plate thicknesses is not constant as a result by a difference in a ratio of applied energy to plate thickness.

As mentioned above, in order to avoid the wire electrode from causing disconnection from a stage in which the plate thickness of the workpiece rapidly changes to a stage where it changes gradually, further, in respect of an unpredictable change in the plate thickness the machining must be carried out by reducing the machining current and in that case, the machining speed is significantly retarded requiring the machining time period. Moreover, the amount of enlarging machining differs by the plate thickness as mentioned above, modification needs to carry out again.

SUMMARY OF THE INVENTION

An object of the invention is to provide a wire electric discharge machine capable of displaying a plate thickness of a workpiece and a machining current density in real time to be able to adjust machining current in accordance with a change in the plate thickness of the workpiece.

Another object of the invention is to provide a wire electric discharge machine capable of promoting machining speed by preventing occurrence of disconnection of a wire electrode even with a change in a plate thickness in a workpiece and improving also a dispersion in a machining enlargement amount caused by the change in the plate thickness.

According to an aspect of the invention, a ratio between inputted energies in machining a predetermined distance is calculated by a ratio between main pulse numbers in machining the predetermined distance or by a ration between summed values of discharge machining currents, a change rate of a thickness of a workpiece is calculated by the ratio, there is installed means for detecting the thickness of the workpiece during the machining operation based on the change rate and the thickness of the workpiece which is set in start of the machining and a relationship between a movement distance of a machining path or a machining time period and the detected thickness of the workpiece is displayed on the display screen of a display device.

Further, the thickness of the workpiece is detected by means for detecting the thickness of the workpiece during the machining operation, there are installed means for detecting machining current and means for calculating a machining current density in respect of a machining face of the workpiece from the detected thickness of the workpiece and the detected machining current and a relationship between a movement distance of a machining path or a machining time period and the detected machining current density is displayed on a display screen of a display device.

Further, means for detecting machining speed is installed and the detected machining speed is displayed on the display screen.

According to other aspect of the invention, a controller is installed with a detection voltage generator for applying detection voltage for detecting a dischargeable state to a discharge gap between a wire electrode and a workpiece, a discharge gap detecting device for detecting the dischargeable state based on a change in the detected voltage, a main pulse generator for supplying a main pulse to the discharge gap based on a signal from the discharge gap detecting device, machining distance calculating means for calculating a machining distance and outputting a signal at each progress of machining by the predetermined distance and plate thickness change detecting means for calculating an energy amount inputted by a main pulse number inputted from the main pulse generator during machining by the predetermined distance at each progress of the machining by the predetermined distance or an integrated value of main pulse current and calculating a plate thickness change rate of the workpiece by a change rate of the inputted energy amount in respect of a reference value or a change rate of the inputted energy amount at each machining of the predetermined distance. Further, there is installed machining condition adjusting means for adjusting the energy amount inputted from the main pulse generator by a pause time period or a peak value or a pulse width of the main pulse current such that a machining current density remains unchanged by the calculated plate thickness change rate and the adjustment is carried out such that the machining current density remains unchanged even with the change in the plate thickness by which a dispersion in a machining enlargement amount is dispensed with and the machining speed is promoted.

DETAILED DESCRIPTION OF THE PREFERRED EMBODIMENTS

Figure 1:
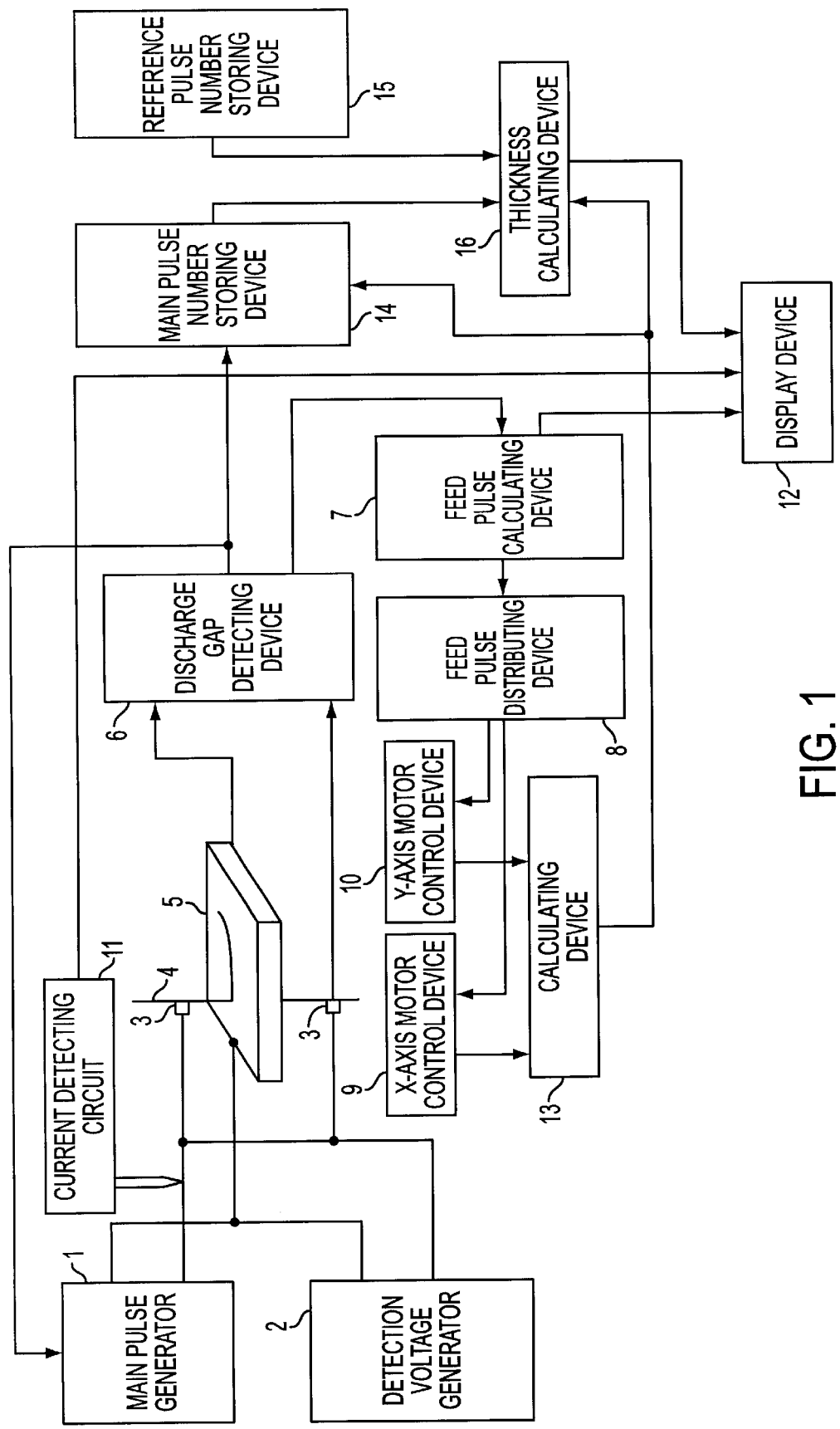
FIG. 1 is a block diagram of functionally essential portions of an embodiment of a wire electric discharge machine and its monitoring apparatus according to the invention.
Figure 29:
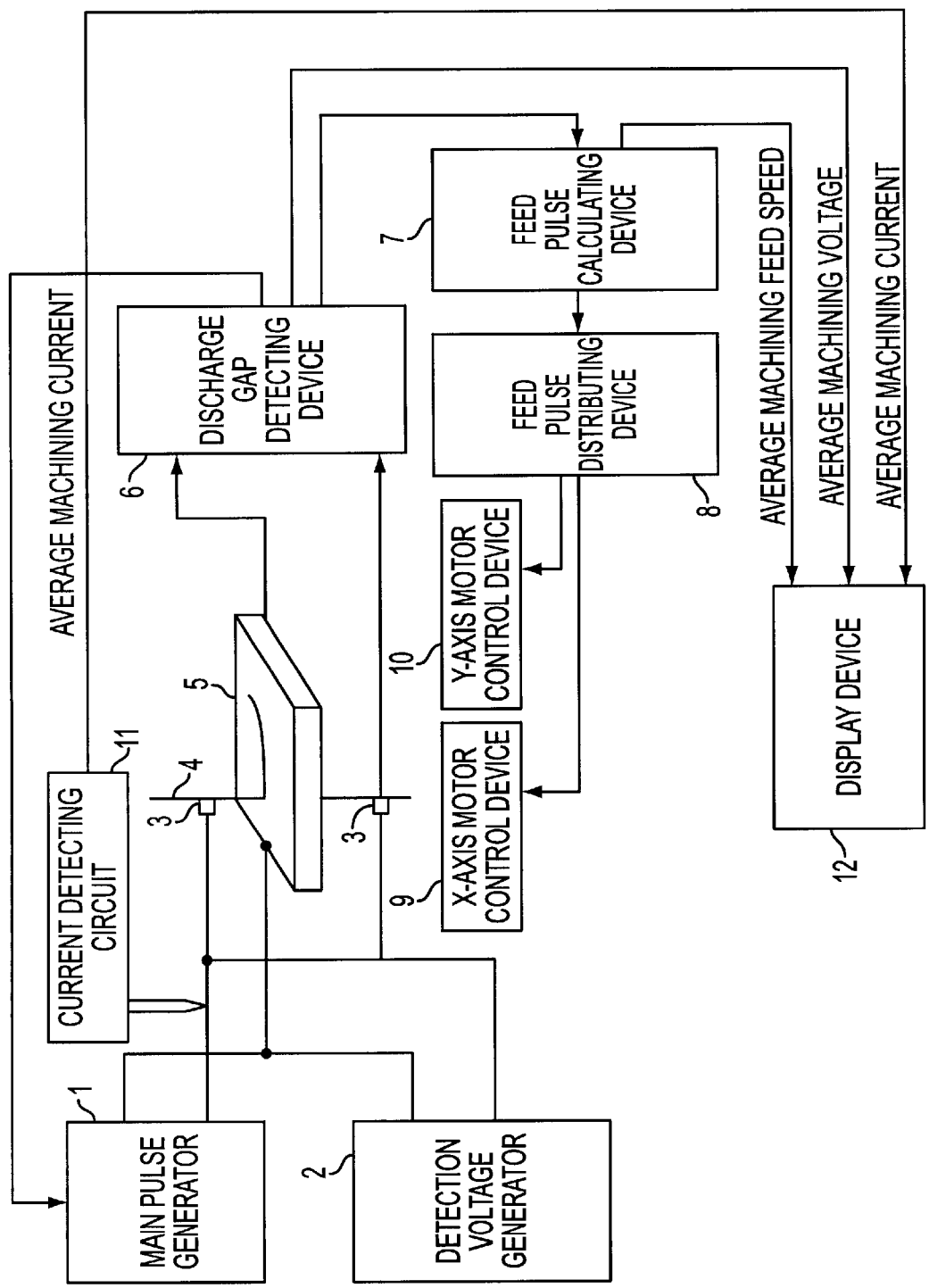
FIG. 29 is an explanatory diagram showing other constitution of a conventional electric discharge machining controller.

FIG. 1 is a block diagram of functionally essential portions of an embodiment of a wire electric discharge machine and its monitor apparatus according to the invention. Portions having constitutions the same as those of the conventional wire electric discharge machine shown by FIG. 29 are attached with the same notations. What is different from the conventional wire electric discharge machine is installment of a machining distance calculating device 13 connected to the X-axis motor control device 9 and the Y-axis motor control device 10 for calculating a machining distance by inputting feed back signals from position detectors attached to motors of the respective shafts and outputting a signal at every movement by a predetermined machining distance, a main pulse number storing device 14 for counting main pulse application instruction signals from the discharge gap detecting device 6, a reference main pulse number storing device 15 for storing to set a main pulse number constituting a reference, a plate thickness calculating device 16 for calculating a plate thickness change rate of the workpiece by an output from the main pulse number storing device 14 and an output from the reference main pulse number storing device 15, as mentioned later, and calculating the plate thickness and the display device 12 for inputting the calculated plate thickness, the average machining current outputted from the current detecting circuit 11 and the average machining feed speed outputted from the feed pulse calculating device 7 and displaying these.

Detection pulse voltage is generated from the detection voltage generator 2 and is applied to the gap between the workpiece 5 and the wire electrode 4. When electricity conduction is caused between the workpiece 5 and the wire electrode 4 and voltage drop is caused between the workpiece 5 and the wire electrode 4, the discharge gap detecting device 6 detects the voltage drop, determines that electricity can be discharged, transmits the main pulse application instruction signal to the main pulse generator 1, makes the main pulse generator 1 generate the main pulse and flows main pulse current (discharge machining current) having a predetermined width to the gap between the workpiece 5 and the wire electrode 4. Further, the main pulse application instruction signal is inputted to the main pulse number storing device 14 and is counted.

Thereafter, after elapse of a pertinent pause time period for cooling the gap, the operational cycle of applying the detection pulse to the gap from the detection voltage generator 2 again is repeatedly executed. Further, the discharge gap detecting device 6 outputs a signal for servo feed to the feed pulse calculating device 7 and the feed pulse calculating device 7 forms a series of pulses controlling the feed pulse interval such that repetition of discharge at the gap is optimized, according to the embodiment, the machining average voltage coincides with set voltage (servo voltage) and outputs the series of pulses to the feed pulse distributing device 8. The feed pulse distributing device 8 distributes the series of pulses to drive pulses of X-axis and Y-axis based on the machining program, outputs them respectively to the X-axis motor control device 9 and the Y-axis motor control device 10, drives a table mounted with the workpiece 5 and carried out machining instructed by the machining program in respect of the workpiece 5.

The machining distance calculating device 13 calculates a relative movement distance of the wire electrode 4 in respect of the workpiece 5 by feed back signals of positions from position detectors attached to the X-axis and Y-axis motors and outputs signals to the main pulse number storing device 14 and the plate thickness calculating device 16 at every movement of a set predetermined machining distance. The main pulse number storing device 14 resets a stored value by receiving the signal and starts counting again the main pulse application signal. Further, the plate thickness calculating device 16 receives the above-described signal and calculates the plate thickness by the main pulse number which has been stored in the main pulse number storing device 14 before resetting and the reference main pulse number stored to set to the reference main pulse number storing device 15. The calculated plate thickness is outputted to the display device 12 and the display device 12 displays the plate thickness in a graph as a function of machining time period or machining distance. Further, the display device 12 is inputted with the average machining current from the current detecting circuit 11 and the average machining speed from the feed pulse calculating device and these data are also displayed in graphs as functions of the machining time period or the machining distance.

At this occasion, an explanation will be given of a method of calculating the plate thickness which is carried out in the plate thickness calculating device 16.

Figures 2, 3:
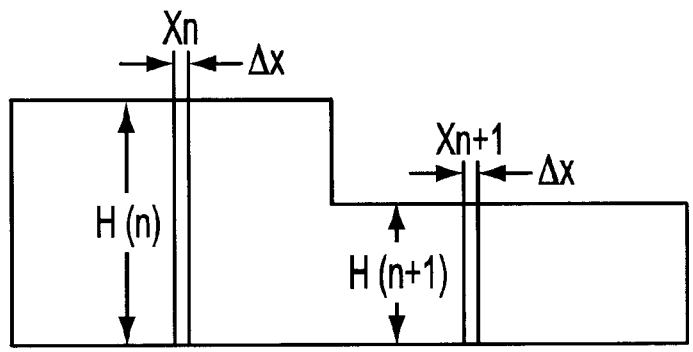
FIG. 2 is an explanatory view for explaining a method of detecting a plate thickness according to the invention.
FIG. 3 is an explanatory view of a table for storing monitor data according to a first embodiment of the invention.

FIG. 2 is an explanatory view of a method of calculating plate thickness in wire electric discharge machining in respect of a workpiece in which the plate thickness is changed from H(n) to H(n+1).

Setting notations as follows, $\Delta x$: set predetermined machining distance
g: machining enlargement amount
A: diameter of wire
P: effective discharge pulse number generated in machining an amount of $\Delta x$ Q: shortcircuit discharge pulse number generated in machining an amount of $\Delta x$
w1: machining amount per shot of effective discharge pulse
w0: machining amount per shot of shortcircuit discharge pulse, when the wire electrode 4 is moved relative to the workpiece 5 by the set predetermined machining distance $\Delta x$, a machined amount and a machining amount are equal to each other and accordingly, a relationship of the following Equation (1) is established.

$$(2\ g+A) \times H \times \Delta x = P \times w1 + Q \times w2 \tag{1}$$

Incidentally, notation H signifies the plate thickness H(n) or H(n+1) in FIG. 2.

Further, when the machining operation is progressed at a high machining efficiency, the shortcircuit discharge pulse number is small and P>>Q, further, the machining amount w0 per shot of the shortcircuit discharge pulse is very small compared with the machining amount w1 per shot of the effective discharge pulse and w1>>w0 and accordingly, by rearranging the above-described Equation (1), the plate thickness H can be approximated by the following Equation (2).

$$H = \{w1/(2\ g+A)\} \times (P/\Delta x) \tag{2}$$

In Equation (2), w1 and g are values substantially determined by materials of the workpiece and the wire electrode, a peak value of the pulse current and the width of the current pulse and can be regarded constant so far as the machining operation is progressed under the same conditions. Further, a value of the wire diameter A is a value unilaterally determined by the wire electrode used and accordingly, when these values are previously set, by measuring (P/$\Delta x$), the plate thickness H can be calculated from Equation (2).

In FIG. 2, when the plate thickness at position Xn is designated by H(n), the effective discharge pulse number counted when the machining is carried out by the predetermined machining distance $\Delta x$ is designated by P(n), the plate thickness at a portion of position Xn+1 is designated by H(n+1) and the effective discharge pulse number is designated by P(n+1), the following equations are established from the above-described two equations.

$$H(n) = \{w1/(2\ g+A)\} \times (P(n)/\Delta x)$$

$$H(n+1) = \{w1/(2\ g+A)\} \times \{P(n+1)/\Delta x)\}$$

Accordingly, when the plate thickness change rate is designated by $\beta$, the following equation is established.

$$\beta = H(n+1)/H(n) = P(n+1)/P(n)$$

Further, P(n+1) and P(n) each signifies an amount of applied energy when machining is carried out by the predetermined machining distance $\Delta x$ when the peak value of the pulse current and the current pulse width are constant. Hence, the main pulse number (effective discharge pulse number) which is generated in machining a reference plate thickness Hs by the set predetermined machining distance $\Delta x$, is defined as a reference pulse number Ps and stored to the reference main pulse number storing device 15. At every time of detecting movement of the set predetermined machining distance $\Delta x$ by the machining distance calculating device 13, the main pulse number P counted and stored by the main pulse number storing device 14 during an interval of the movement distance is calculated and the plate thickness change rate can be calculated as β=P/Ps from the main pulse number P and the reference pulse number Ps, that is, the applied energy amount (P) and the reference energy application amount (Ps).

Further, the plate thickness change rate in respect of the reference plate thickness is β=H/H(s) and accordingly, by multiplying the reference plate thickness Hs by the calculated plate thickness change rate β(=P/Ps), the plate thickness H of the workpiece 5 during the machining operation is known. H is calculated by Hs×(P/Ps).

Figure 4:
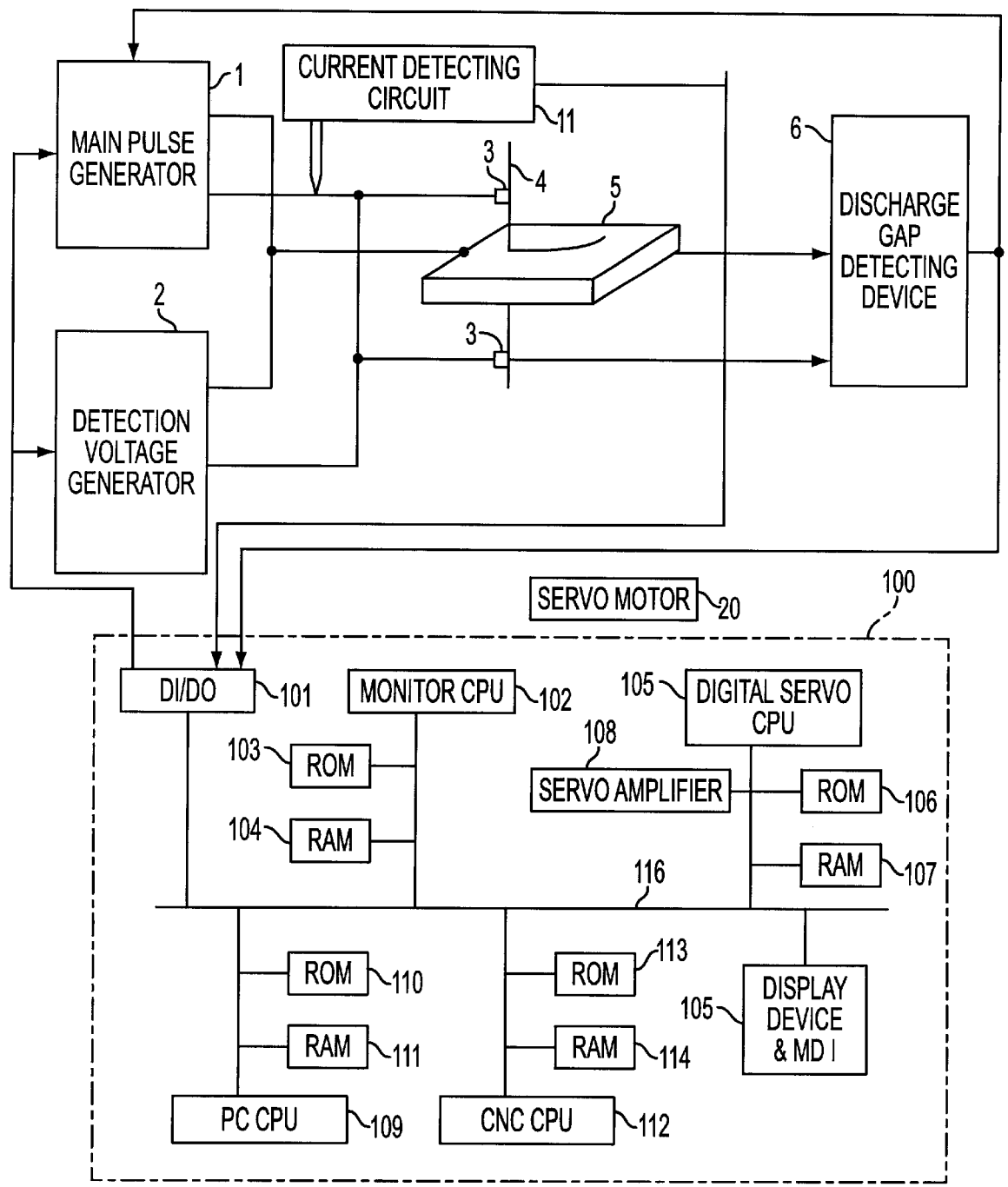
FIG. 4 is a block diagram of essential portions of the first embodiment according to the invention.

FIG. 4 is block diagram of essential portions according to an embodiment of the invention.

According to the embodiment, CNC (Computer Numeral Control) apparatus is used as a controller 100 and function and operation of elements 7 through 15 in FIG. 1 are carried out by the controller 100. Further, elements the same as elements shown by FIG. 1 are attached with the same notations.

The controller 100 is provided with a monitor CPU (processor for monitoring) 102 for monitoring discharge, calculating the servo feed amount and monitoring the main pulse number of discharge, a digital servo CPU (processor for servo control) 105 for controlling to drive servo motors of X-axis and Y-axis for moving the workpiece 5 relative to the wire electrode 4, PCCPU (processor for programmable controller) 109 for forming display data, controlling display of drawn picture and sequentially controlling the wire electric discharge machine and CNCCPU (processor for numerical control) 112 for controlling machining position based on the machining program and these CPU are connected to a bus 116. Further, the bus 116 is connected with an input/output circuit 101 and a display device & MID (manual input device with display device) 105.

ROM 103 storing a system program for the monitor CPU and RAM 104 installed with a table for storing detected monitor data, mentioned later, are connected to the bus 106. Further, ROM 106 for storing a system program for the digital servo CPU 105 to carry out servo control, RAM 107 utilized for temporarily storing various data and a servo amplifier 108 for controlling to drive servo motors of X-axis and Y-axis, are connected by the bus. Further, although servo motors of respective shafts are connected to the servo amplifier 108, in FIG. 4, only one servo motor 20 is shown. Further, although not illustrated, each of the servo motors is attached with a position and speed detector for detecting position and speed of the workpiece 5 relative to the wire electrode 4.

Also PCCPU 109 is connected with ROM 110 storing a system program for CPU 109 and RAM 111 used for temporarily storing data by the bus and CNCCPU 112 is connected with ROM 113 for storing a system program for CPU 112 and RAM 114 used for temporarily storing data by the bus. The controller 100 constituted by the above-described CNC device remains the same as and not different from the conventional controller.

Similar to the conventional controller, CNCCPU 112 controls an interval of feel pulse (controls feed speed) such that the average machining voltage of the gap between the workpiece 5 and the wire electrode 4 stays constant based on the machining program stored in RAM 114 and distributes movement instruction to respective shafts, a digital servo CPU carries out feedback control of position and speed based on the distributed movement instruction and feedback signals of position and speed from position and speed detectors attached to the respective servo motors and controls to drive the servo motors 20 of the respective shafts via the servo amplifiers 108. Further, similar to the conventional device, the discharge gap detecting device 6 detects that the discharge gap is brought into a dischargeable state by lowering the detection pulse voltage, outputs the main pulse application instruction signal to the main pulse generator 1 and the input/output circuit 101 and the main pulse generator 1 generates the main pulse and flows the main pulse current (discharge machining current) to the gap between the workpiece 5 and the wire electrode 4. Further, the current detecting circuit 11 detects machining current and outputs average machining current I during a predetermined time period at every predetermined period of time to the input/output circuit 101. The above-described operation is the same as that of the conventional controller.

The invention is featured in that plate thickness of the workpiece 5 can be displayed and monitored in real time in the controller 100 and an explanation will be given of operation and action of the point in reference to flowcharts shown by FIG. 5 and FIG. 6.

Figure 5:
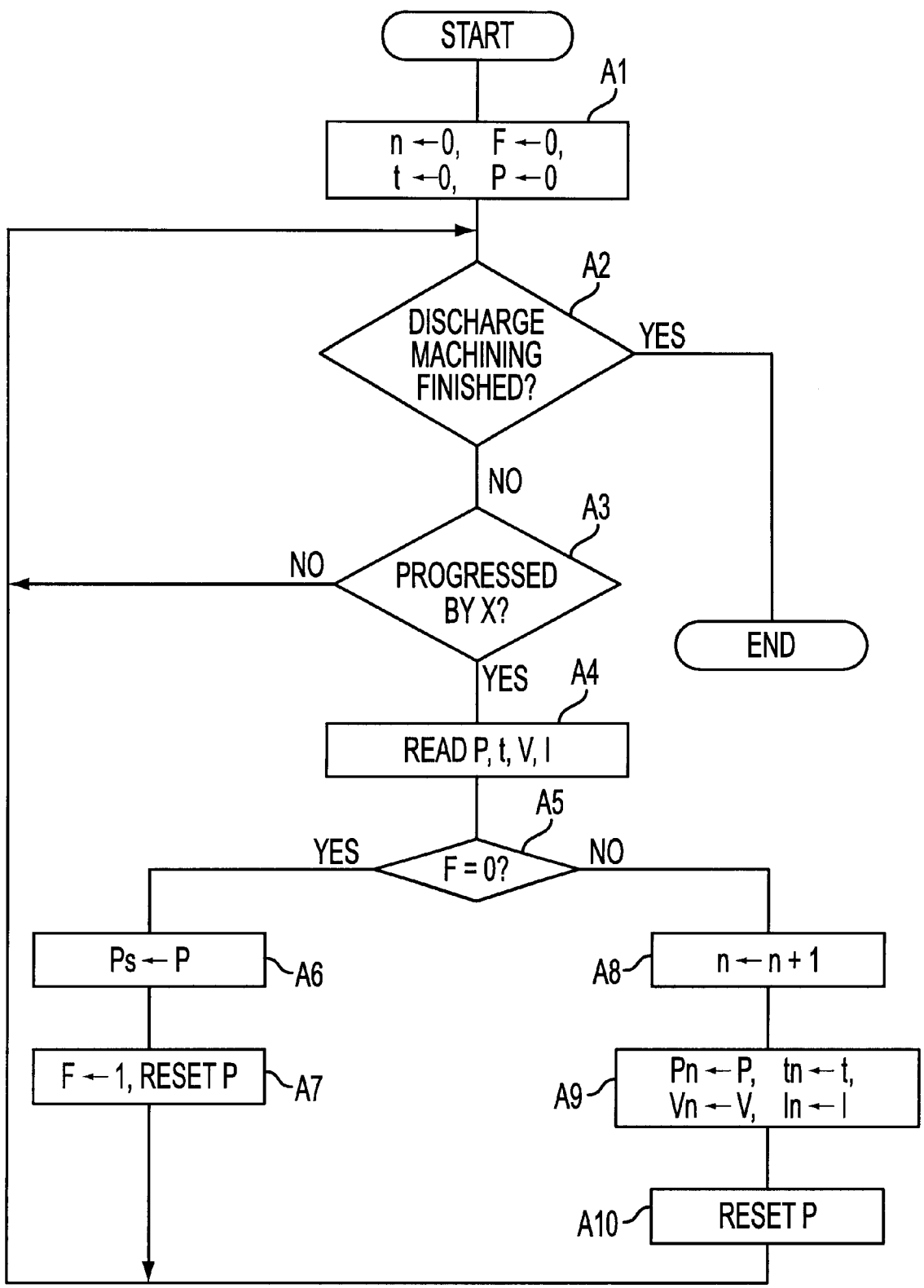
FIG. 5 is a flowchart for obtaining monitor data according to the first embodiment.

FIG. 5 is a flowchart of a processing of inputting monitor data which the monitor CPU 102 executes at a predetermined period of time by a multiple task processing. First, an operator inputs plate thickness at start of machining the workpiece 5 as reference plate thickness Hs and stores it to a table 30 as shown by FIG. 3 installed in RAM 104. Further, when the machining instruction is inputted, CNCCPU 112 starts machining by distributing movement instruction to the respective shafts based on the machining program. The monitor CPU 102 resets registers for storing writing index n designating address of the table 30 for storing monitor data, flag F, timer t and the main pulse number P to "zero", and starts the timer (Step A1). The monitor CPU 102 then determines whether the discharge machining has been finished or not (Step A2) and when it has not been finished, determines whether the machining distance is progressed by the set distance Δx or not (Step A3). Processings of Steps A2 and A3 are repeated until progress of the set distance Δx is detected.

Further, although calculation of the distance Δx is not shown in the flowchart, RAM 107 is installed with registers of current values of the respective shafts for summing up positional feedback signals which are fed back from the position and the speed detectors of X-axis and Y-axis and storing the current position in the processing of the digital servo CPU 105. Values of the respective shaft current value of registers are stored at the start of machining and at every detection of movement of the predetermined distance Δx and a movement amount is calculated by a difference between the values of registers of the respective shaft current value detected at every processing time period and the stored values and whether the movement amount is equal to or larger than the set distance Δx is determined.

Further, the monitor CPU 102 simultaneously monitors the main pulse application instruction signal outputted from the discharge gap detecting device 6 in parallel with the processings shown by FIG. 5, counts the number, that is, the main pulse number P and stores it to a register in RAM 104.

Then, when the movement amount is detected to be equal to or more than the set distance Δx at Step A3, the monitor CPU 102 reads values of the main pulse number P and timer t which are stored at that time and reads machining speed (feed speed) V at the time point which is calculated by CNCCPU 112 and the average machining current I outputted from the current detecting circuit 11 (Step A4). Next, whether flag F is "null" is determined and when the flag F is "null" and it is detected that machining by the first set distance Δx from start of machining has been finished, the main pulse number P read at Step A4 is stored to the table 30 as the reference main pulse number Ps (Step A6), the flag F is set to "1", a register storing the main pulse number P is reset (Step A7) and the operation proceeds to Step A2.

When movement of the set distance Δx is detected by repeatedly executing processings of Steps A2 and A3, the operation proceeds to Step A4, reads the main pulse number P, the value of the timer t, the machining speed V and the average machining current I and proceeds from Step A5 to A8 since the flag F is set to "1". Further, the index n is incremented by "1" and the main pulse number P, the value of the timer t, the machining speed V and the machining current I read at Step A4 are stored to addresses of the table 30 respectively indicated by the index n as Pn, Tn, Vn and In (Step A9). Next, a register storing the main pulse number P is reset (Step A10) and the operation returns to Step A2. Thereafter, processings of Steps A2 through A5 and A8 through A10 are repeatedly executed and the main pulse number P, the value of the timer t, the machining speed V and the machining current I are stored in the table 30 as shown by FIG. 3 at every progress of machining by the set distance Δx until the electric discharge machining is finished.

Figure 6:
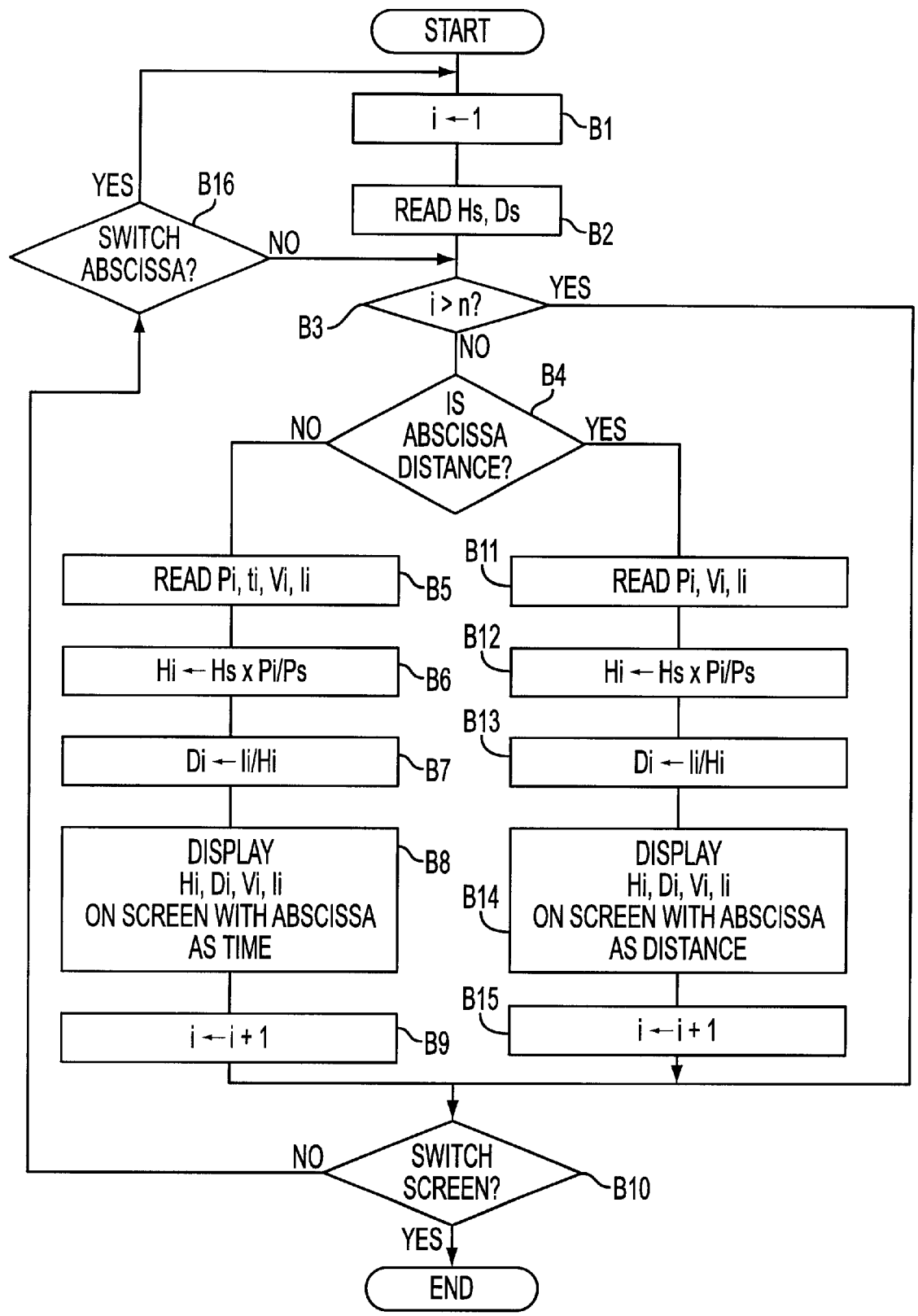
FIG. 6 is a flowchart of a processing of displaying monitor data according to the first embodiment.

FIG. 6 is a flowchart of a processing of displaying monitor data executed by PCCPU 109.

When a display screen of monitor data is selected, PCCPU 109 starts the processing of FIG. 6, firstly, sets the reading index i designating address for reading data from the table 30 to "1" (Step B1) and reads the reference plate thickness Hs and the reference main pulse number Ps stored at the table 30 (Step B2). Next, the operation determines whether the reading index i of data is larger than the index n for designating address of writing data (Step B3), when a value of the index i is smaller than a value of the index n, the operation determines whether the abscissa of the display screen is set to distance (Step B4) and when the abscissa is set to time, the operation proceeds to Step B5 and reads data Pi, ti, Vi and Ii stored to addresses indicated by the index i from the table 30. Further, as mentioned above, plate thickness Hi is calculated by multiplying a value produced by dividing the read main pulse number Pi by the reference main pulse number Ps (as described above, the value signifies the plate thickness change rate β) by the reference plate thickness Hs (Step B6). Further, current density Di is calculated by dividing the read average machining current Ii by the plate thickness Hi calculated at Step B6 (Step B7).

Figure 7:
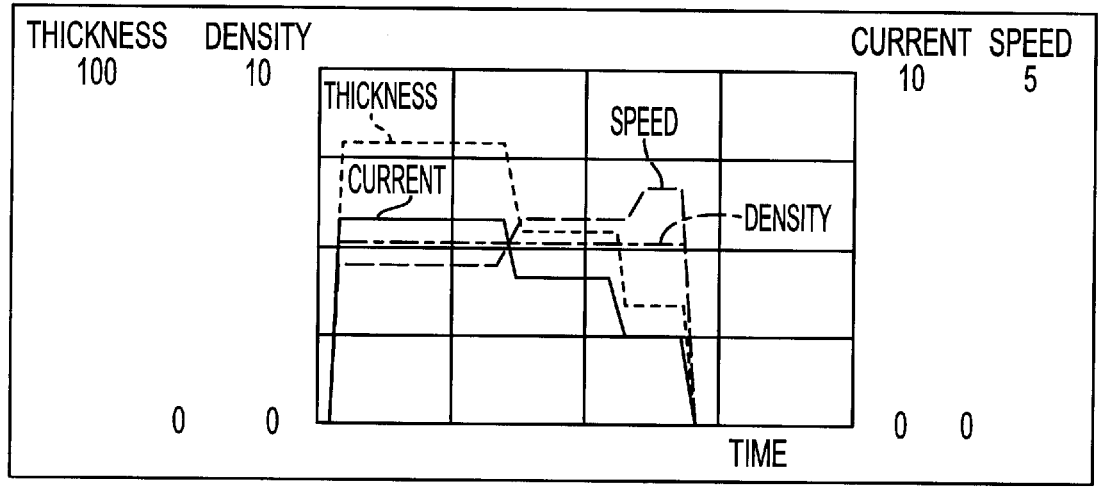
FIG. 7 is a diagram showing a display example of monitor data with the abscissa of time according to the first embodiment.

Next, time is set to the abscissa and the plate thickness, the current density, the machining speed and the machining current are set to the ordinate (refer to FIG. 7), a position in correspondence with the read timer value Hi is sought at the abscissa, positions respectively in correspondence with the calculated plate thickness Hi, the current density Di, the machining speed Vi and the machining current Ii are sought at the ordinate and the plate thickness Hi, the current density Di, the machining speed Vi and the machining current Ii are displayed on a display screen of the display device and MDI105 at positions where the sought positions of the abscissa and the ordinate are intersected with each other (Step B8). Thereafter, the index i is incremented by "1" (Step B9), the operation determines whether the screen is switched (Step B10), when the monitor screen is not switched, the operation determines whether the abscissa is switched and set to distance (Step B16) and when it is not switched and the abscissa designates time, the operation proceeds to Step B3. Thereafter, when there is no switching of the screen and switching of the abscissa, processings of Steps B3 through B10 and B16 are repeatedly executed until the reading index i exceeds the writing index n and the plate thickness, the current density, the machining speed and the machining current are displayed in the display screen of the display device and MDI105 with the abscissa as time axis as shown by FIG. 7.

Further, when the index i exceeds the index n, the operation proceeds from Step B3 to Step B10 and new picture drawing processing is stopped. Meanwhile, when the index n is incremented by "1" by the processing at the Step A8 shown by FIG. 5 and new monitor data is added to write to the table 30, values of the index i and the index n coincide with each other at Step B3 and accordingly, the operation carries out processings at Step B4 and Step B5 and carries out the above-described display processing and the plate thickness, the current density, the machining speed and the machining current are additionally displayed on the display screen (Steps B6 through B8). That is, at every time of progress of the machining speed by Δx, the monitor data Pi, ti, Vi and Ii are increased and based on the increased monitor data, the plate thickness Hi, the current density Di, the machining speed Vi and the machining current Ii are calculated and additionally displayed on the display screen and these data are displayed in real time.

Figure 8:
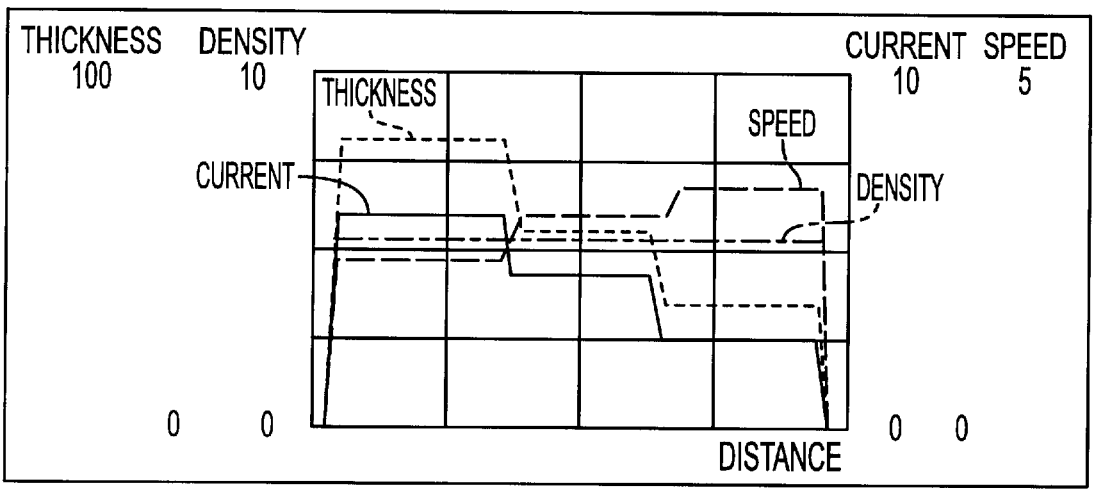
FIG. 8 is a diagram showing a display example of monitor data with the abscissa of distance according to the first embodiment.

Further, when the abscissa is set to distance, the operation proceeds from Step B4 to Step B11, carries out Steps B11 through B13 which are processings the same as those of Steps B5 through B7 mentioned above, calculates the plate thickness Hi and the current density Di, sets distance to the abscissa and displays by graphs these data at positions in correspondence with the plate thickness Hi, the current density Di, the machining speed Vi and the machining current Ii of the ordinate at a position of the abscissa in correspondence with a position of the index i multiplied by Δx (Step B14). Further, the index i is incremented by "1", the operation proceeds to Step B10, repeats processings of Steps B3, B4, B11 through B15, B10 and B16 until the index i exceeds the value of the index n when there is no switching of screen and switching of the abscissa and displays the plate thickness Hi, the current density Di, the machining speed Vi and the machining current Ii with the abscissa as distance as shown by FIG. 8.

Further, also in this case, although the display is stopped at time point at which the reading index i exceeds the value of the writing index n, when the writing index n is incremented and new monitor data is written to the table 30, processings of Steps B3, B4 and B11 through B15 are immediately executed and new ones of the plate thickness Hi, the current density Di, the machining speed Vi and the machining current Ii are displayed and displayed in real time.

Further, when the operator sets to change the abscissa from time to distance or from distance to time, PCCPU 109 detects the change at Step B16, the processing returns to Step B1, executes display processing from the start and reexecutes drawing in conformity with the abscissa set to time or distance.

Figure 10:
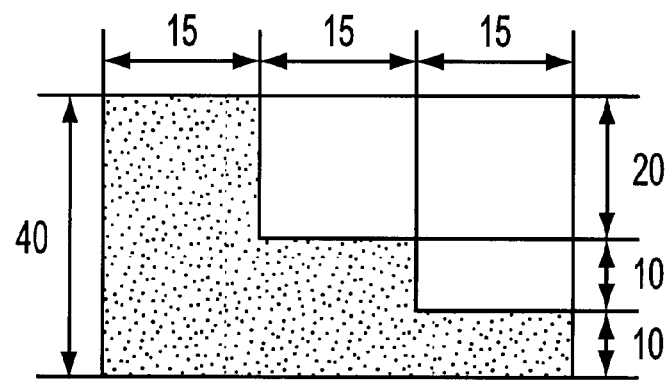
FIG. 10 is an explanatory diagram of a workpiece where plate thickness is varied.
Figure 11:
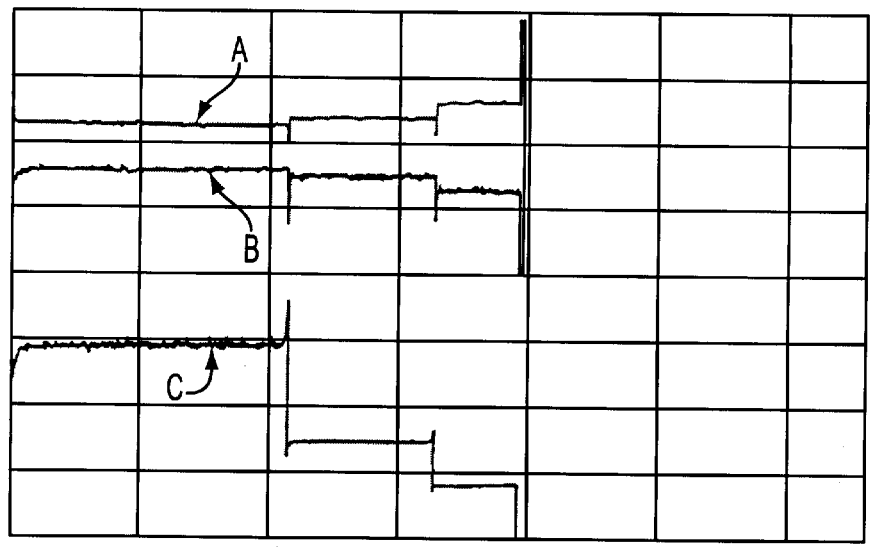
FIG. 11 is a monitor diagram of machining average current, machining average voltage and the like in machining the workpiece shown by FIG. 10 by a conventional method.

As described above, the plate thickness Hi, the current density Di, the machining speed Vi and the machining current Ii are displayed on the display screen in real time and when the plate thickness of the workpiece 5 is changed in the midst of machining, the plate thickness on the display screen is also changed. FIG. 7 and FIG. 8 show monitor display screens provided in machining the workpiece 5 the plate thickness of which is changed as shown by FIG. 10 and when the plate thickness is reduced, as shown by FIG. 7 and FIG. 8, the display plate thickness is also reduced. Further, as is apparent from FIG. 11, the average machining current stays substantially constant and remains unchanged and accordingly, the current density Di produced by dividing the average machining current Ii by the calculated plate thickness Hi is to be increased (in FIG. 7 and FIG. 8, the increased current density Di is not displayed). Hence, the operator confirms that the plate thickness has been changed on the display screen, adjusts the pause time period of pulse applied to the gap between the workpiece 5 and the wire electrode 4, or the feed speed (servo voltage in servo feed control for controlling feed speed such that the average machining voltage at the gap between the workpiece 5 and the wire electrode 4 becomes set servo voltage) or applied voltage of pulse and adjusts the machining current such that the displayed current density Di stays constant and remains unchanged before and after change of the plate thickness. FIG. 7 and FIG. 8 display the current density Di after the adjustment.

Figure 12:
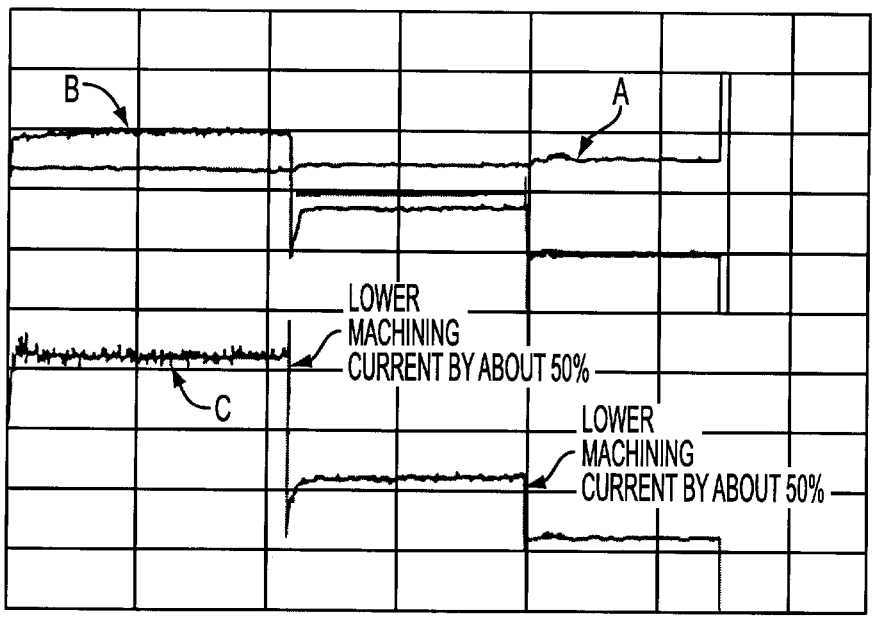
FIG. 12 is a monitor diagram of machining average current, machining average voltage and the like when the workpiece shown by FIG. 10 is machined by the invention.

It is known from FIG. 7 and FIG. 8 that the adjustment is carried out such that the current density Di remains unchanged even when the plate thickness is changed and when the plate thickness is reduced, the value of the average machining current is also reduced and the machining speed is conversely increased. Further, FIG. 12 displays by graphs the machining average voltage and the machining average current when the workpiece 5 the plate thickness of which is changed is machined, shown in FIG. 10, the adjustment of the machining current in changed of the plate thickness according to the invention is carried out and in conformity with the change of plate thickness, the machining current is reduced by 50% at time point at which the plate thickness is reduced by 50%. By comparing FIG. 12 with FIG. 11 in which the machining by the conventional method is carried out, in the case of the invention shown by FIG. 12, a machining condition (machining current) suitable for the plate thickness can be used and therefore, the machining time period is short and the machining is finished by about 14 minutes. However, in the case of the conventional method, the machining condition (machining current) is determined in conformity with an occasion in which the plate thickness is small and accordingly, the machining time period is prolonged at an occasion where the plate thickness is large and the machining time period of about 20 minutes is required.

Further, when the plate thickness is changed in three steps as shown by FIG. 10, the initially machined plate thickness is set to Hs as a reference plate thickness, the reference main pulse number at the occasion is set to Ps, the plate thickness at the second step is set to H1 and the plate thickness at the third step is set to H2 and the main pulse number when the plate thickness is changed from Hs to H1 is set to P1, then, the plate thickness H1 at the second step is defined as follows.

$$H1=Hs(P1/Ps) \quad (3)$$

At this occasion, assume that the machining current is adjusted and the main pulse number in machining the plate thickness at the second step is P2. However, although the machining speed is changed before and after adjusting the machining current, an amount of machining stays constant since the plate thickness stays constant and the machining is carried out by the movement distance Δx, inputted energy stays constant and accordingly, a relationship of P1=P2 is established. Further, assume that the main pulse number is changing from the plate thickness at the second step to the third plate thickness is P3, then, in view of a relationship of the plate thickness from the second step to the third step, the reference plate thickness is H1 and the reference main pulse number is P2 and the plate thickness H2 at the third step is as follows from the above-described equation (3).

$$H2=H1(P3/P2)=Hs(P1/Ps)(P3/P2)$$

As mentioned above, P2=P1, as a result, the following equation is established.

$$H2=Hs(P3/Ps) \quad (4)$$

Even when the plate thickness is changed by a number of times and the machining current is adjusted at each occasion, the plate thickness Hi can be calculated by the reference plate thickness Hs and the reference main pulse number Ps which are initially set and calculated and the main pulse number Pi at each of progress of machining by Δx.

Second Embodiment

In the above-described embodiment, voltage lower than the main pulse voltage is applied from the detection voltage generator 2 to the gap between the workpiece 5 and the wire electrode 4 and power source for applying the main pulse is used to determining whether electricity can be discharged by lowering of the voltage of the gap. Thereby, energy of discharge by one time of the main pulse stays constant. Therefore, by counting a number of the main pulse applied between the workpiece 5 and the wire electrode 4, an amount of energy inputted for discharge machining can be calculated. The inputted energy amount can also be calculated by summing up discharge current in place of counting the number of the main pulse. Further, a summed value of discharge current at each of progress of machining by Δx is calculated and the plate thickness can also be calculated by the summed value.

Figure 9:
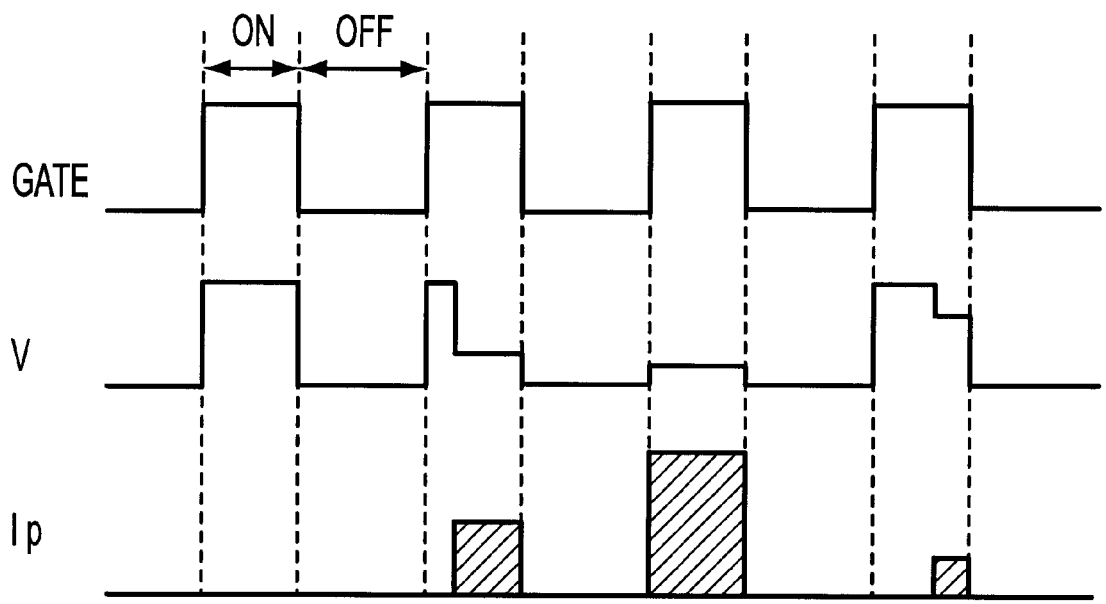
FIG. 9 is an explanatory view of peak values of discharge current and discharge current in a discharge machining power source in which the width is not constant.

Particularly, although the method of detecting the plate thickness by the inputted energy amount (summed value of discharge current) by calculating the inputted energy amount by the summed value of discharge current, is applicable to a case in which a value of discharge current and time width by main pulse stay constant as in the above-described embodiment, the method is rather suitable for the case in which values and time widths of respective discharge current are different from each other. For example, as a power source, the method is suitable for the case of using a discharge machining power source using capacitor discharge which has conventional been publicly-known or a discharge machining power source in which direct current voltage is applied between the workpiece 5 and the wire electrode 4 simply by switching elements and discharge is awaited. For example, in the case of a discharge machining power source in which charge voltage of a capacitor or direct current power source voltage is applied between the workpiece 5 and the wire electrode 4 by switching elements by opening a gate only by a set ON time period as shown by FIG. 9, discharge current is flowed when discharge is caused between the workpiece 5 and the wire electrode 4 during the ON time period to thereby carry out discharge machining, peaks and time widths of the discharge current are varied by discharge start time and as shown by FIG. 9, an amount of energy of discharge current by one time of discharge is varied. Therefore, the amount of inputted energy dissipated in the discharge machining is calculated not by counting the discharge pulse but by calculating the summed value of the discharge current and is used in place of the main pulse number P in the above-described embodiment.

In this case, according to the processing executed by the monitor CPU 102 of the controller 100, the number of application instruction of main pulse from the discharge gap detecting device, that is, the main pulse number P is not counted but the average machining current outputted from the current detecting circuit 11 is read at every predetermined time period and summed up to a register and the current summed value is used in place of the main pulse number P which is a point of difference and the other remains the same as in the above-described embodiment.

Also in the processing of obtaining monitor data shown by FIG. 5, only P may be replaced by the current summed value. Further, also in the processing of displaying monitor data shown by FIG. 6, P is replaced by the current summed value.

Third Embodiment

According to the first and the second embodiments mentioned above, as a method of calculating the plate thickness, as shown by Steps B6 and B12 of FIG. 6, the reference plate thickness Hs and the reference inputted energy amount Ps in correspondence with the reference plate thickness (main pulse number or discharge current summed value) are used. However, in place of the reference plate thickness Hs and the reference inputted energy amount Ps, at every progress of machining by the set distance Δx, plate thickness Hi of the current time may be calculated by plate thickness Hi-1 and inputted energy amount Pi-1 which have been calculated at a preceding time. In this case, according to the processing shown by FIG. 5, plate thickness which is set before start of machining is set to an initial value and is stored to a register storing plate thickness at a preceding time and according to Step A6, the inputted energy amount P which has been calculated (main pulse number or discharge current summed value) is stored to a register storing inputted energy amount at a preceding time. Otherwise, processings similar to those of the processings shown by FIG. 5 are carried out and the table 30 as shown by FIG. 3 is formed.

Meanwhile, according to the processing of FIG. 6, the processing at Step B2 is not carried out, the operation proceeds from Step B1 to B3 and according to the processings at Steps B5 and B11, data Pi, ti, Vi and Ii stored to the table 30 are read and the plate thickness and the inputted energy amount are read from registers storing the plate thickness and the inputted energy amount at a preceding time. The read plate thickness and the inputted energy amount are defined as Hi-1 and Pi-1 as those at the preceding time. Further, in the plate thickness calculating processing at Steps B6 and B12, the plate thickness Hi is calculated by carrying out the following calculation.

$$Hi=Hi\text{-}1(Pi/Pi\text{-}1) \quad (5)$$

Further, the calculated plate thickness Hi and the inputted energy amount Pi at current time are stored to register storing the plate thickness and the inputted energy amount at the preceding time and the operation proceeds to Step B7 or B13. The following steps are the same as those in the processing of FIG. 6.

By the above-described processings, when the plate thickness of the workpiece 5 remains unchanged, the machining amount of the machining distance Δx remains unchanged, the inputted energy amount remains unchanged and accordingly, the inputted energy amount Pi-1 at the preceding time and the inputted energy amount Pi at the current time are substantially equal to each other and the plate thickness Hi calculated by the above-described equation stays the same as the plate thickness Hi-1 at the preceding time. Meanwhile, when the plate thickness is changed, a difference is caused in the amount of machining when the machining is carried out by the machining distance Δx in accordance with the change in the plate thickness. Further, a difference is also caused in the inputted energy amount by the difference in the machining amount and accordingly, a difference is caused between Pi and Pi-1. As a result, the changed plate thickness Hi is calculated by the above-described equation (5) and the plate thickness is stored to the register storing the plate thickness at the preceding time.

In this way, the plate thickness can successively be calculated based on the plate thickness and the inputted energy at the preceding time.

Fourth Embodiment

Figure 13:
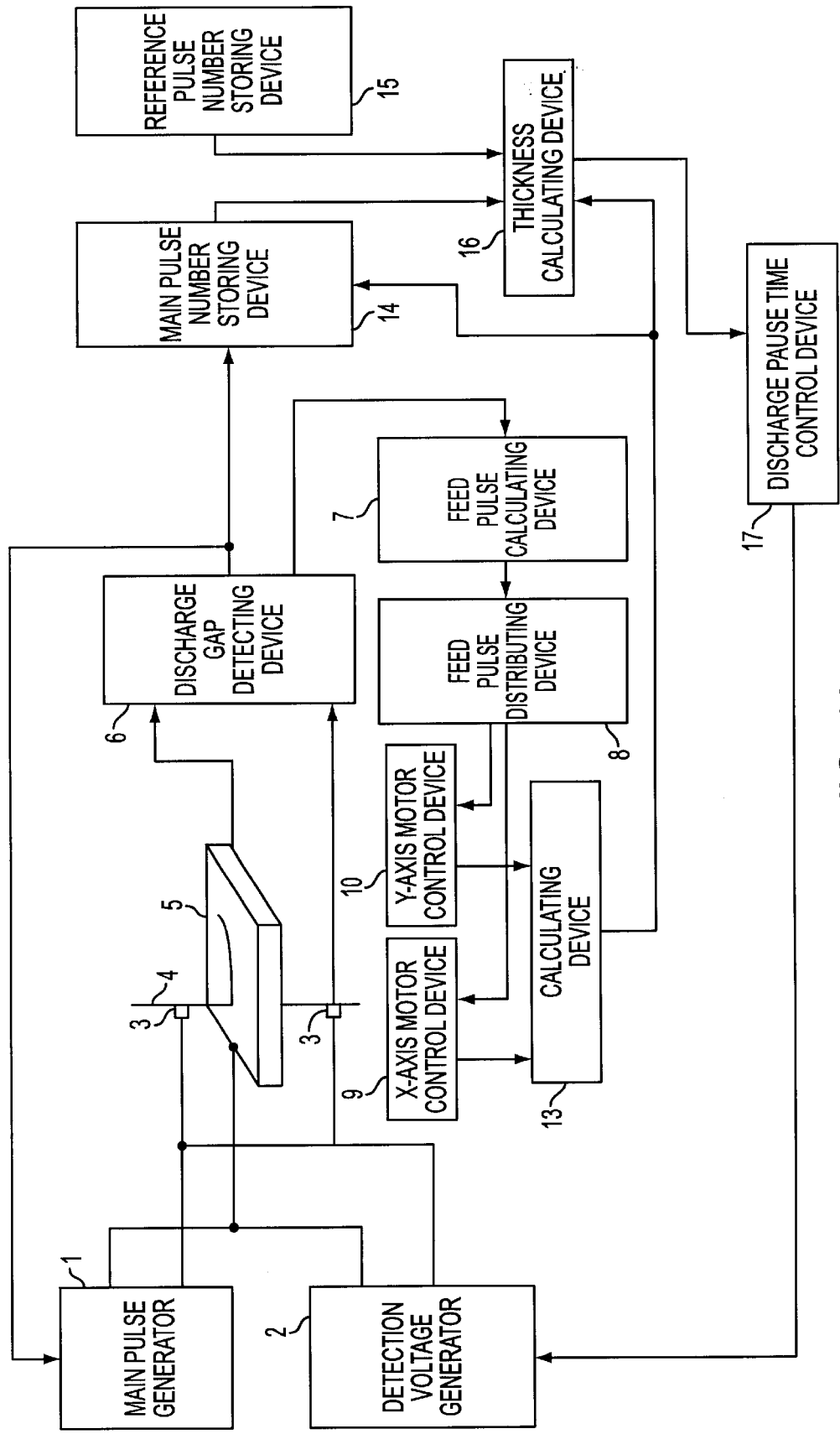
FIG. 13 is a constitution diagram of a fourth embodiment according to the invention.
Figure 28:
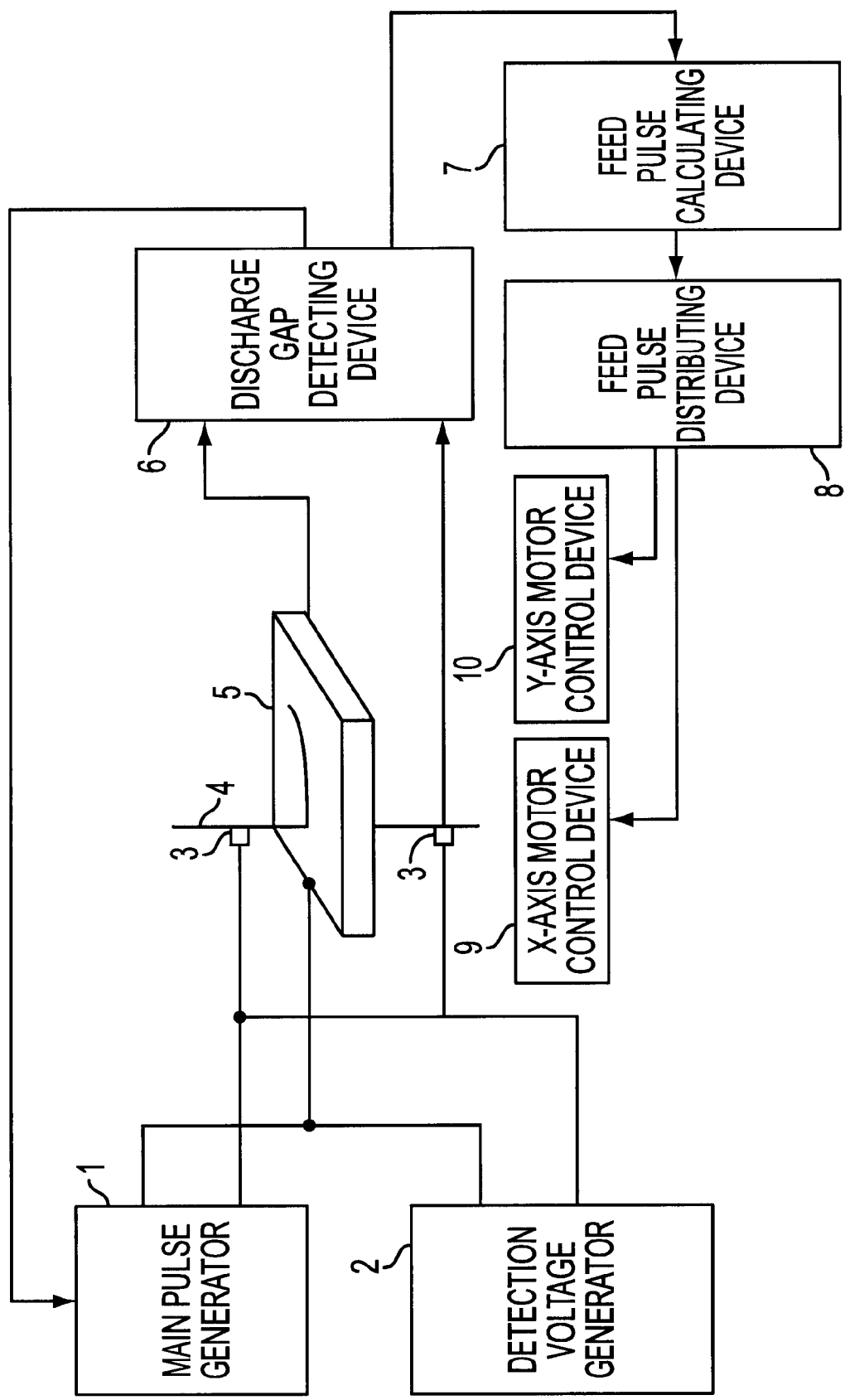
FIG. 28 is an explanatory diagram showing the constitution of a conventional electric discharge machining controller.

FIG. 13 is a constitution diagram of essential portions of a fourth embodiment of a wire electric discharge machine according to the invention. What are different from the conventional wire electric discharge machine shown by FIG. 28 are installment of the machining distance calculating device 13 connected to the X-axis motor control device 9 and the Y-axis motor control device 10 for calculating machining distance by inputting feedback signals from position detectors attached to motors of the respective shafts and outputting a signal at every movement of predetermined machining distance, the main pulse number storing device 14 for counting a main pulse input signal from the discharge gap detecting device 6, the reference main pulse number storing device 15 for storing to set the main pulse number constituting the reference, the plate thickness calculating device 16 for calculating the plate thickness change rate of the workpiece by an output from the main pulse number storing device 14 and an output from the reference main pulse number storing device 15, as mentioned later, and a discharge pause time control device 17 for calculating a pause time period of the detection pulse by the calculated plate thickness.

That is, according to the fourth embodiment, plate thickness change detecting means is constituted by the main pulse number storing device 14, the reference main pulse number storing device 15 and the plate thickness calculating device 16 and the discharge pause time control device 17 is installed as machining condition adjusting means. As compared with the first embodiment shown in FIG. 1, the fourth embodiment differs in that a discharge pause time control device 17 is provided in place of the display device 12 and that the current detecting circuit 11 is not provided.

Detection pulse voltage is applied from the detection voltage generator 2 to the gap between the workpiece 5 and the wire electrode 4. When a voltage drop is caused between the workpiece 5 and the wire electrode 4, the discharge gap detecting device 6 transmits the main pulse input signal to the main pulse generator 1, and flows the main pulse current with a predetermined width (discharge machining current) from the main pulse generator 1 to the gap between the workpiece 5 and the wire electrode 4. Further, the main pulse input signal is inputted to the main pulse number storing device 14 and is counted.

Thereafter, after elapse of a pertinent pause time period for cooling the gap, the operational cycle for applying the detection pulse to the gap from the detection voltage generator 2 again is repeatedly executed. Further, the discharge gap detecting device 6 transmits a signal for servo feed to the feed pulse calculating device 7, and the feed pulse calculating device 7 forms a series of pulses such that repetition of discharge at the gap is optimized and outputs the series of pulses to the feed pulse distributing device 8. The feed pulse distributing device 8 distributes the series of pulses to drive pulses of X-axis and Y-axis based on the machining program, outputs them respectively to the X-axis motor control device 9 and the Y-axis motor control device 10, drives a table and carries out the machining.

The machine distance calculating device 13 outputs a signal to the main pulse number storing device 14 and the plate thickness calculating device 16 each time when the wire electrode 4 relatively moves with respect of the workpiece 5 by a predetermined machining distance. The main pulse number storing device 14 counts and stores the main pulse input signals between the above outputted signals. Further, the plate thickness calculating device 16 receives the above outputted signal, calculates the plate thickness by the main pulse number which has been stored in the main pulse number storing device 14 and the reference main pulse number stored to set to the reference main pulse number storing device 15. The above procedure is the same as that in the first embodiment shown in FIG. 1. In this fourth embodiment, by the calculated plate thickness, the discharge pause time control device 17 calculates a pause time period of the outputted pulse, outputs it to the detection voltage generator 2 and sets the pause time period.

Then, the plate thickness H is obtained by the plate thickness calculating device 16. As described in the first embodiment shown in FIG. 2, the plate thickness change rate β is obtained as P/Ps the main pulse number P and the reference pulse number Ps when the plate thickness is changed from H(n) to H(n+1). The plate thickness calculating device 16 performs the calculation of "P/Ps" to obtain the plate thickness change rate β based on the main pulse number P stored in the main pulse number storing device 14 and the reference pulse number Ps stored in the reference main pulse number storing device 15. A wire-disconnection and a change in the machining enlargement amount are dispensed with by optionally controlling the machining current by controlling the machining current density such that it is not changed by a change in the plate thickness based on thus obtained plate thickness change rate β.

Further, according to the fourth embodiment shown by FIG. 13, the machining current is optimally controlled by controlling the discharge pause time period by the discharge pause time control device 17.

Figure 21:
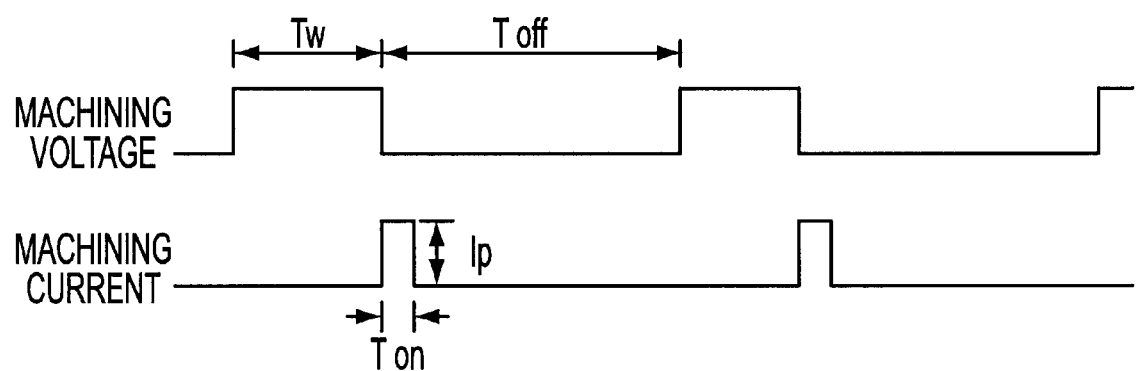
FIG. 21 is an explanatory diagram of machining voltage and machining current.

As shown by FIG. 21, a time period from when detection voltage is applied from the detection voltage generator 2 to the gap between the wire electrode 4 and the workpiece 5 to when main pulse current is inputted is defined as a no load machining time period Tw. A current peak value is designated by Ip and a current pulse width thereof is designated by Ton in the case in which when electricity conduction is caused between the wire electrode 4 and the workpiece 5 and detected voltage is lowered, the voltage drop is detected by the discharge gap detecting device 6, a main pulse input signal is outputted and main pulse current is inputted from the main pulse generator 1. Further, a time period for stopping to apply the detection voltage to the gap is defined as a pause time period and is designated by Toff. Further, the average machining current is designated by Im and the machining current density is designated by Id in one discharge cycle. Further, in FIG. 2, respective values at Xn portion and Xn+1 portion are designated as follows.

Current peak value (A): Ip(n), Ip(n+1)
Current pulse width (μs): Ton(n), Ton(n+1)
Pause time period (μs): Toff(n), Toff(n+1)
No load machining time period (μs): Tw(n), Tw(n+1)
Average machining current (A): Im(n), Im(n+1)
Machining current density (A/mm$^2$): Id(n), Id(n+1)
Plate thickness: H(n), H(n+1)

In this case, the average machining currents Im(n) and Im(n+1) and the machining current densities Id(n) and Id(n+1) are calculated by the following relationships.

$$Im(n)=Ip(n)\times Ton(n)/(Tw(n)+Toff(n)) \quad (6)$$

$$Id(n)=Im(n)/(H(n)\times(A+2\ g)) \quad (7)$$

$$Im(n+1)=Ip(n+1)\times Ton(n+1)/(Tw(n+1)+Toff(n+1)) \quad (8)$$

$$Id(n+1)=Im(n+1)/(H(n+1)\times(A+2\ g)) \quad (9)$$

When the current densities at portions of positions Xn and Xn+1 are made constant (Id(n)=Id(n+1)), the following equation (10) is obtained from Equation (7) and Equation (9).

$$Im(n)/(H(n)\times(A+2\ g))=Im(n+1)/(H(n+1)\times(A+2\ g)) \quad (10)$$

From Equation (10), H(n+1)/H(n)=Im(n+1)/Im(n) is established and the equation signifies the plate thickness change rate β and the following equation (11) is established.

$$\beta=H(n+1)/H(n)=Im(n+1)/Im(n) \quad (11)$$

That is, when the current density is made constant, a change rate of the machining average current Im coincides with the plate thickness change rate and the machining average current Im is proportional to the plate thickness t.

Meanwhile, machining conditions in wire electric discharge machining may be considered normally as the following conditions. That is, approximation can be carried out as follows.

$$Ton(n)<<Tw(n)+Toff(n)$$

$$Ton(n+1)<<Tw(n+1)+Toff(n+1)$$

$$Ip(n)=Ip(n+1)$$

Further, following approximation can be carried out.

$$Ton(n)=Ton(n+1)$$

Hence, by rearranging Equations (6), (7) and (10) from the above-described conditions, the following equation is established.

$$\beta=Im(n+1)/Im(n)=\{Tw(n)+Toff(n)\}/\{Tw(n+1)+Toff(n+1)\} \quad (12)$$

Equation (12) signifies that in order to make constant the current densities at portions of positions Xn and Xn+1, a value of a time period of pause of machining (Tw(n)+Toff(n)) which is produced by adding the pause time period Toff(n) to the no load machining time period Tw(n) at the portion of position X(n) multiplied by a reciprocal number of the plate thickness change rate β, is determined as a time period (Tw(n+1)+Toff(n+1)) in which machining pauses at a portion of position X(n+1).

Meanwhile, when servo feed control is carried out such that the machining average voltage becomes constant, machining voltages at portions of positions Xn and Xn+1 of FIG. 2 are substantially equal to each other and accordingly, the following equation is established.

$$Tw(n)/\{Tw(n)+Toff(n)\}=Tw(n+1)/\{Tw(n+1)+Toff(n+1)\}$$

From the above equation, the following equation is established.

$$Tw(n+1)/Tw(n)=\{Tw(n+1)+Toff(n+1)\}/\{Tw(n)+Toff(n)\} \quad (13)$$

From Equation (7) and Equation (8), the following equations are established.

$$Tw(n+1)=Tw(n)/\beta \quad (14)$$

$$Toff(n+1)=Toff(n)/\beta \quad (15)$$

As a result, it signifies that in order to make constant the machining current density when the plate thickness is changed, the pause time period Toff(n+1) after change of the plate thickness may be changed to a value of the pause time period Toff(n) before change of the plate thickness multiplied by the reciprocal number of the plate thickness change rate β (1/β).

Hence, returning to the fourth embodiment, shown by FIG. 13, as mentioned above, according to the plate thickness calculating device 16, the plate thickness change rate β in respect of the reference plate thickness Hs is calculated by the main pulse number P counted at the main pulse number storing device 14 and the reference pulse number Ps stored to the reference main pulse number storing device 15 and therefore, according to the discharge pause time control device 17, the pause time period Toff(s) in machining the reference plate thickness Hs set by Equation (15) is multiplied by the reciprocal number of the plate thickness change rate β and the pause time period Toff optimum to the plate thickness of the workpiece 5 in machining is calculated and outputted to the detection voltage generator 2. The detection voltage generator 2 sets the pause time period Toff to pause time period Toff in a cycle applying detection voltage to the gap between the workpiece 5 and the wire electrode 4. Thereby, there is carried out machining by machining current density the same as the machining current density in machining the reference plate thickness Hs and even when the plate thickness is changed, there is no occurrence of disconnection of the wire electrode and the machining enlargement amount can be prevented from changing.

Figure 22:
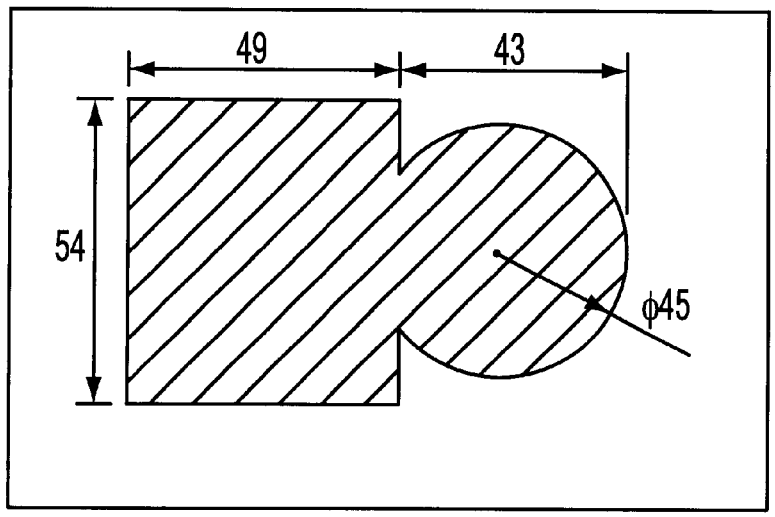
FIG. 22 is a sectional view of a workpiece for machining to compare the invention and a conventional example.
Figure 23:
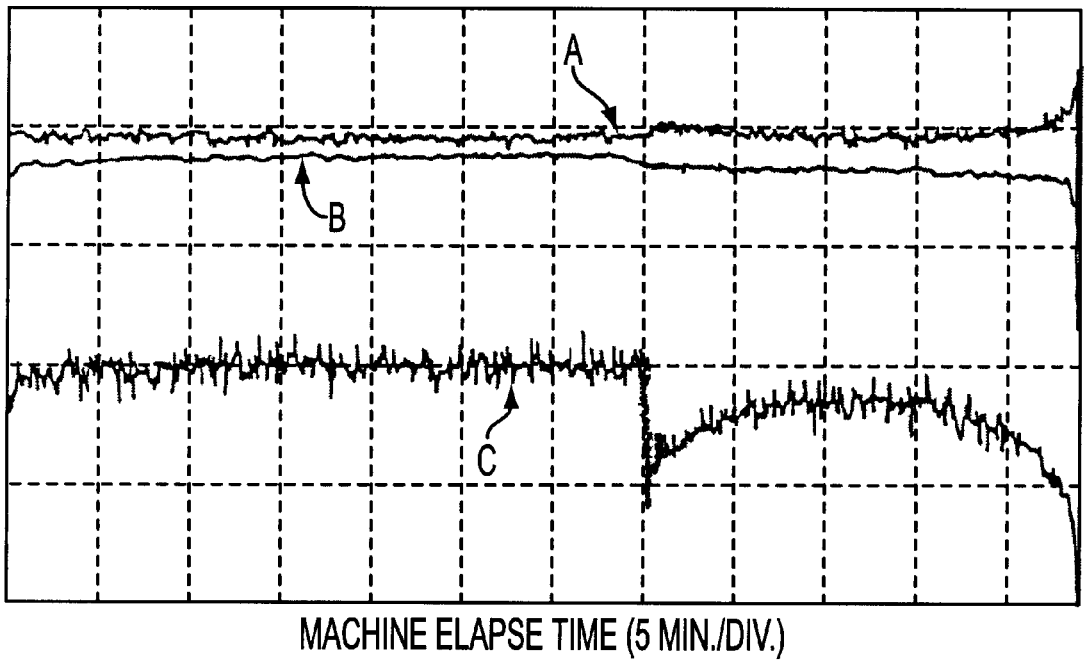
FIG. 23 is a monitor diagram when the workpiece having a sectional view shown by FIG. 22 is machined by a conventional electric discharge machining controller.
Figure 24:
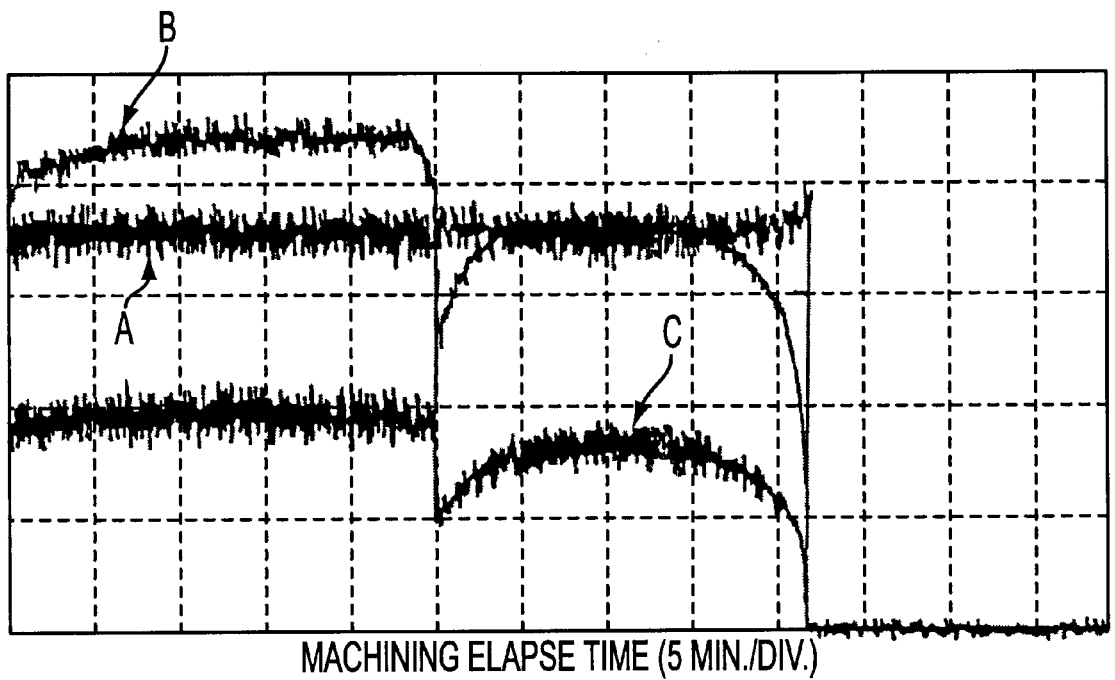
FIG. 24 is a monitor diagram when the workpiece having the sectional view shown by FIG. 22 is machined by the fourth embodiment of the invention.

FIG. 24 shows monitor waveforms when the above-described control is executed by the controller of the wire electric discharge machine according to the first embodiment in slicing the workpiece shown by FIG. 22. FIG. 24 shows that current is property controlled in accordance with a change in the plate thickness. Therefore, the machining average current can be increased more than that of the conventional control shown by FIG. 23 and the machining time period is shown to be shortened significantly.

Fifth Embodiment

Figure 14:
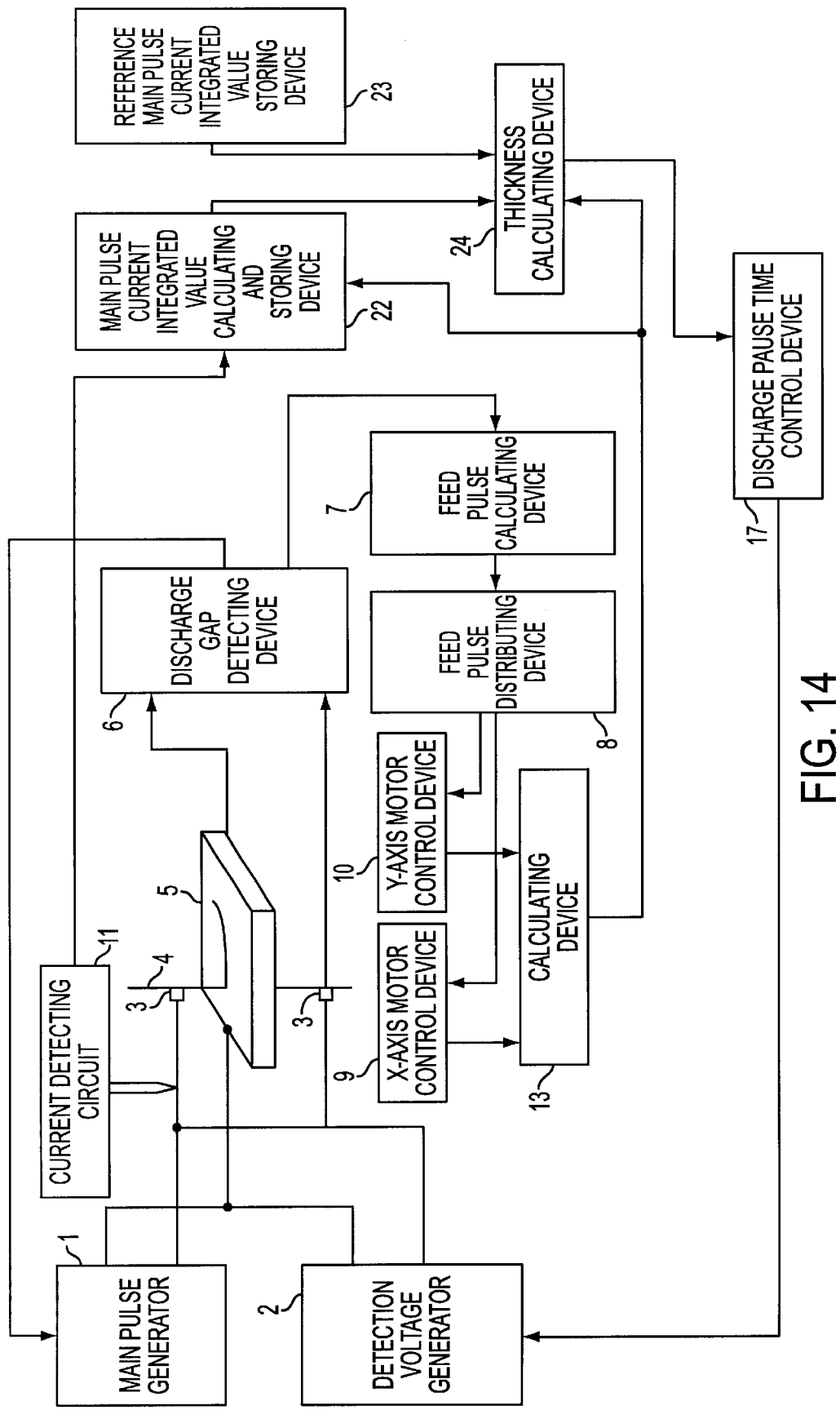
FIG. 14 is a constitution diagram of a fifth embodiment according to the invention.

FIG. 14 shows a fifth embodiment of the invention. Portions of the fifth embodiment having constitutions the same as those of the fourth embodiment are attached with the same notations. Further, what are different therefrom resides in that the current detecting circuit 11 for detecting discharge current is installed, in place of the main pulse number storing device 14, the reference main pulse number storing device 15 and the plate thickness calculating device 16 of the plate thickness change detecting means according to the fourth embodiment, a main pulse current integrated value calculating and storing device 22, a reference main pulse current integrated value storing device 23 and a plate thickness calculating device 24 for calculating the plate thickness change rate by these current integrated values are installed as plate thickness change detecting means. That is, while according to the fourth embodiment, the input energy amount for machining is counted by the main pulse number, according to the fifth embodiment, it is calculated by the main pulse current integrated value.

According to the main pulse current integrated value calculating and storing device 22, during a time period of a signal outputted at each progress of machining of the machining distance Δx set by the machining distance calculating device 13, a current value of discharge current (main pulse current) detected by the current detecting circuit 11 is integrated and the integrated value is outputted to the plate thickness is calculating device 24. Further, the reference main pulse current integrated value storing device 23 stores an integrated value of a current value of discharge current (main pulse current) during progress of machining of the machining distance Δx in machining the reference plate thickness Hs and the plate thickness calculating device 24 calculates the plate thickness change rate β by the reference integrated value and the integrated value outputted from the main pulse current integrated value calculating and storing device 22. Further, the plate thickness calculating device 24 differs from the plate thickness calculating device 16 in the fourth embodiment in that the plate thickness change rate β is calculated by the current integrated value.

That is, in Equation (1) and Equation (2) mentioned above, Equation (2) is established even when P designates an integrated value of discharge current (main pulse current) and w1 designates a machining amount per unit amount of discharge current (main pulse current). Further, w1 and g in Equation (2) are values substantially determined by materials of the workpiece and the wire electrode and are constant. As a result, when an integrated value of discharge current (main pulse current) before change of plate thickness is designated by P(n), an integrated value after the change is designated by P(n+1), as mentioned above, the following relationship is established.

$$\beta = H(n+1)/H(n)=P(n+1)/P(n)$$

The plate thickness change rate β in respect of the reference plate thickness Hs is expressed as follows.

$$\beta = H/HS=P/P(s)$$

Hence, according to the fifth embodiment, at each progress of machining of the set machining distance Δx, the plate thickness change rate β in respect of the reference plate thickness Hs is calculated by the plate thickness calculating device 24 from the integrated value P of discharge current (main pulse current) during the time period which is integrated by the main pulse current integrated value calculating and storing device 22, the reference plate thickness Hs stored to the reference main pulse current integrated value storing device 23 and the integrated value P(s) of discharge current (main pulse current) in machining the portion Δx. Based on the plate thickness change rate β, similar to the fourth embodiment, the discharge pause time control device 17 calculates the pause time period Toff optimum to the plate thickness of the workpiece 5 in machining by multiplying the pause time period Toff(s) in machining the reference plate thickness Hs by the reciprocal number of the plate thickness change rate β and outputs it to the detection voltage generator 2.

Sixth Embodiment

Figure 15:
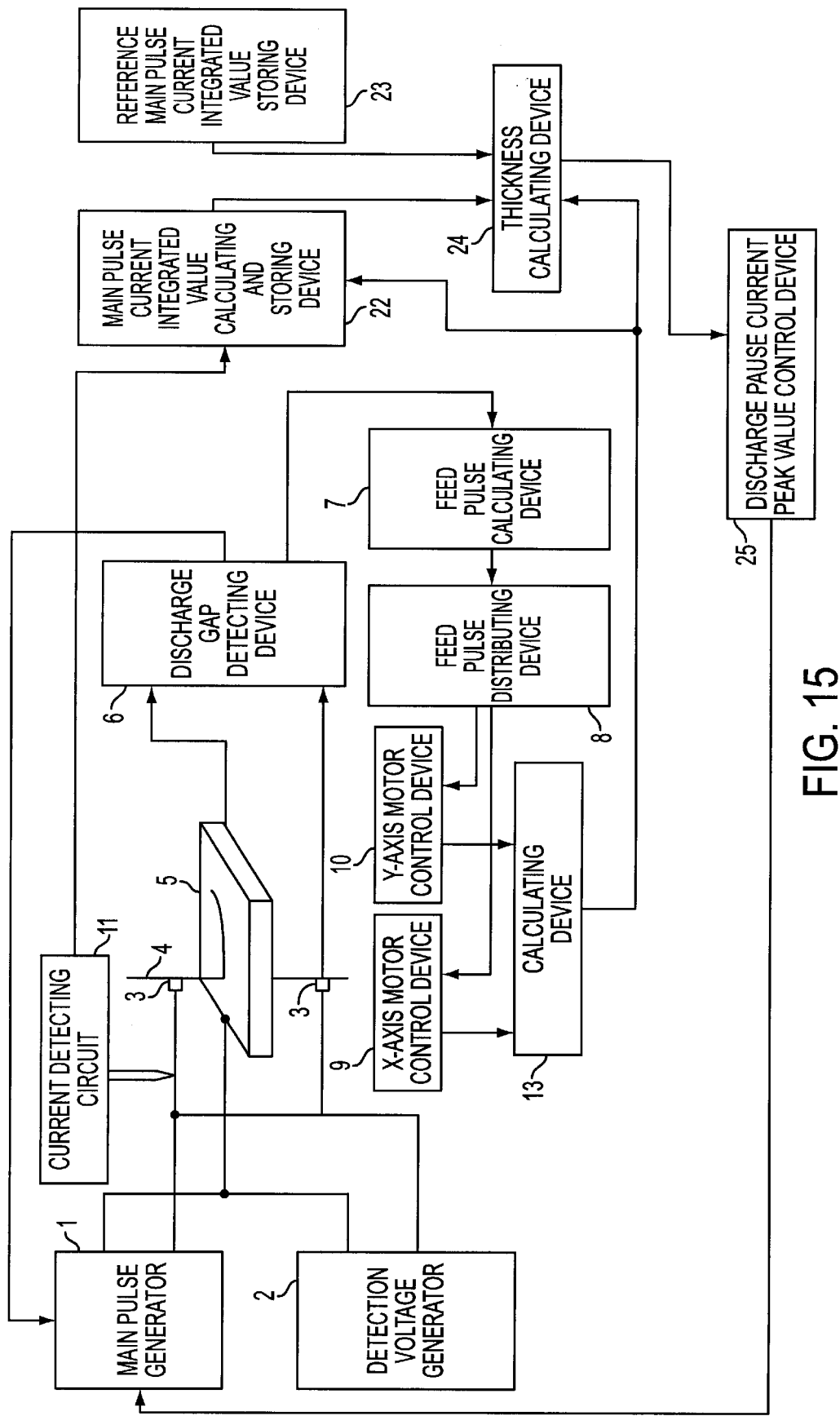
FIG. 15 is a constitution diagram of a sixth embodiment according to the invention.

FIG. 15 shows a sixth embodiment of the invention. Portions of the sixth embodiment having constitutions the same as those of the fifth embodiment are attached with the same notations. Further, what differs therefrom resides in that in place of the discharge pause time control device 17 as machining condition adjusting means in the fifth embodiment, a discharge pulse current peak value control device 25 is installed and a current peak value Ip of discharge pulse calculated by the discharge pulse current peak value control device 25 is outputted to the main pulse generator 1. Further, the current peak value Ip is determined by main pulse voltage applied from the main pulse generator 1 to the gap between the wire electrode 4 and the workpiece 5 and the main pulse voltage is switched by the calculated current peak value.

Explaining the control principle of the sixth embodiment, the invention is on the premise of servo feed in which the machining average voltage stays constant and accordingly, the following conditions may be established.

$$Toff(n)=Toff(n+1),\ Ton(n)=Ton(n+1)$$

$$Tw(n)+Toff(n)=Tw(n+1)+Toff(n+1)$$

Hence, by rearranging Equations (6), (7) and (10) and the above-described conditions, the following relationship is established.

$$\beta=Im(n+1)/Im(n)=Ip(n+1)/Ip(n) \tag{16}$$

Accordingly, the following relationship is established.

$$Ip(n+1)=\beta \times (n) \tag{17}$$

In order to make constant the machining current density in change of plate thickness, the main pulse current peak value Ip(n+1) after change of plate thickness may be changed to a value of the main pulse current peak value Ip(n) before change of plate thickness multiplied by the plate thickness change rate β.

Hence, according to the sixth embodiment, similar to the fifth embodiment, the plate thickness change rate β in respect of the reference plate thickness Hs is calculated by the plate thickness calculating device 24, in the discharge pulse current peak value control device 25, the main pulse peak value Ips in respect of the previously set reference plate thickness Hs is multiplied by the plate thickness change rate β, the value is transmitted to the main pulse generator 1 and in the main pulse generator 1, the main pulse voltage is changed in accordance with the value and is applied to the gap between the wire electrode 4 and the workpiece 5.

Seventh Embodiment

Figure 16:
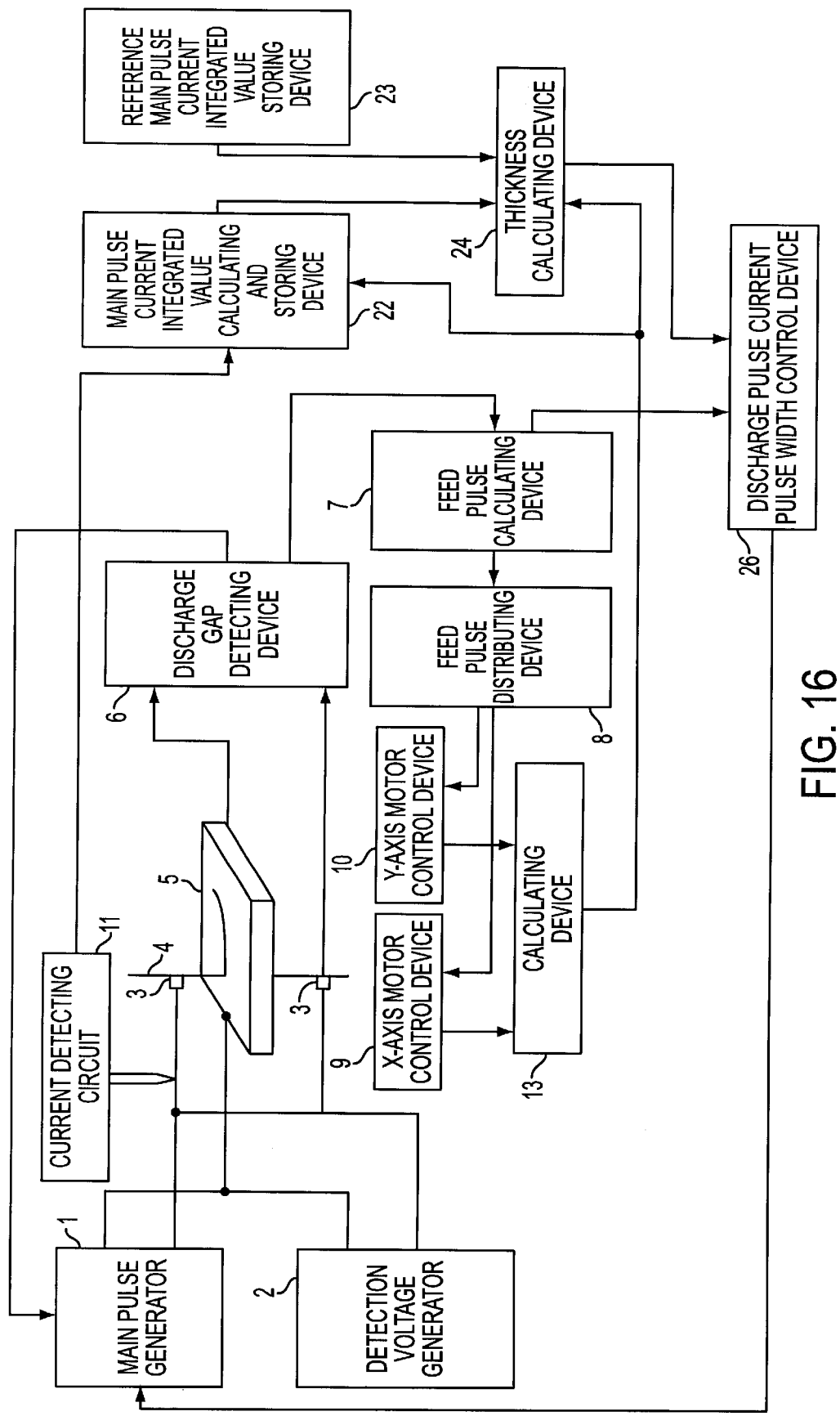
FIG. 16 is a constitution diagram of a seventh embodiment according to the invention.

FIG. 16 is a constitution diagram of a seventh embodiment of the invention. What differs from the sixth embodiment resides in that a discharge pulse current pulse width control device 26 is installed as machining condition adjusting means in place of the discharge pulse current peak value control device 25 according to the sixth embodiment and the current pulse width Ton of main pulse generated from the main pulse generator 1 is changed by an output from the device 26.

In the case of servo feed control in which the machining average voltage stays constant, the following conditions may be established.

$$Toff(n)=Toff(n+1),Ip(n)=Ip(n+1)$$

$$Tw(n)+Toff(n)=Tw(n+1)+Toff(n+1)$$

Hence, by rearranging Equations (6), (8) and (10) and the above-described conditions, the following relationship is established.

$$\beta=Im(n+1)/Im(n)=Ton(n+1)/Ton(n) \tag{18}$$

Accordingly, the following relationship is established.

$$Ton(n+1)=\beta \times (n) \tag{19}$$

As a result, in order to make constant the machining current density in change of plate thickness, the pulse width Ton(n+1) of main pulse current after change of plate thickness may be changed to a value of the pulse width Ton(n) of main pulse current before change of plate thickness multiplied by the plate thickness change rate β.

Hence, according to the seventh embodiment, similar to the sixth embodiment, the plate thickness change rate β in respect of the reference plate thickness Hs is calculated by the plate thickness calculating device 24, the pulse width Ton(s) of main pulse current in respect of the previously set reference plate thickness Hs is multiplied by the plate thickness change rate β by the discharge pulse current pulse width control device 26 and the value is transmitted to the main pulse generator 1. The main pulse generator 1 changes main pulse application time period in accordance with the value and applies it to the gap between the wire electrode 4 and the workpiece 5.

Eighth Embodiment

Figure 17:
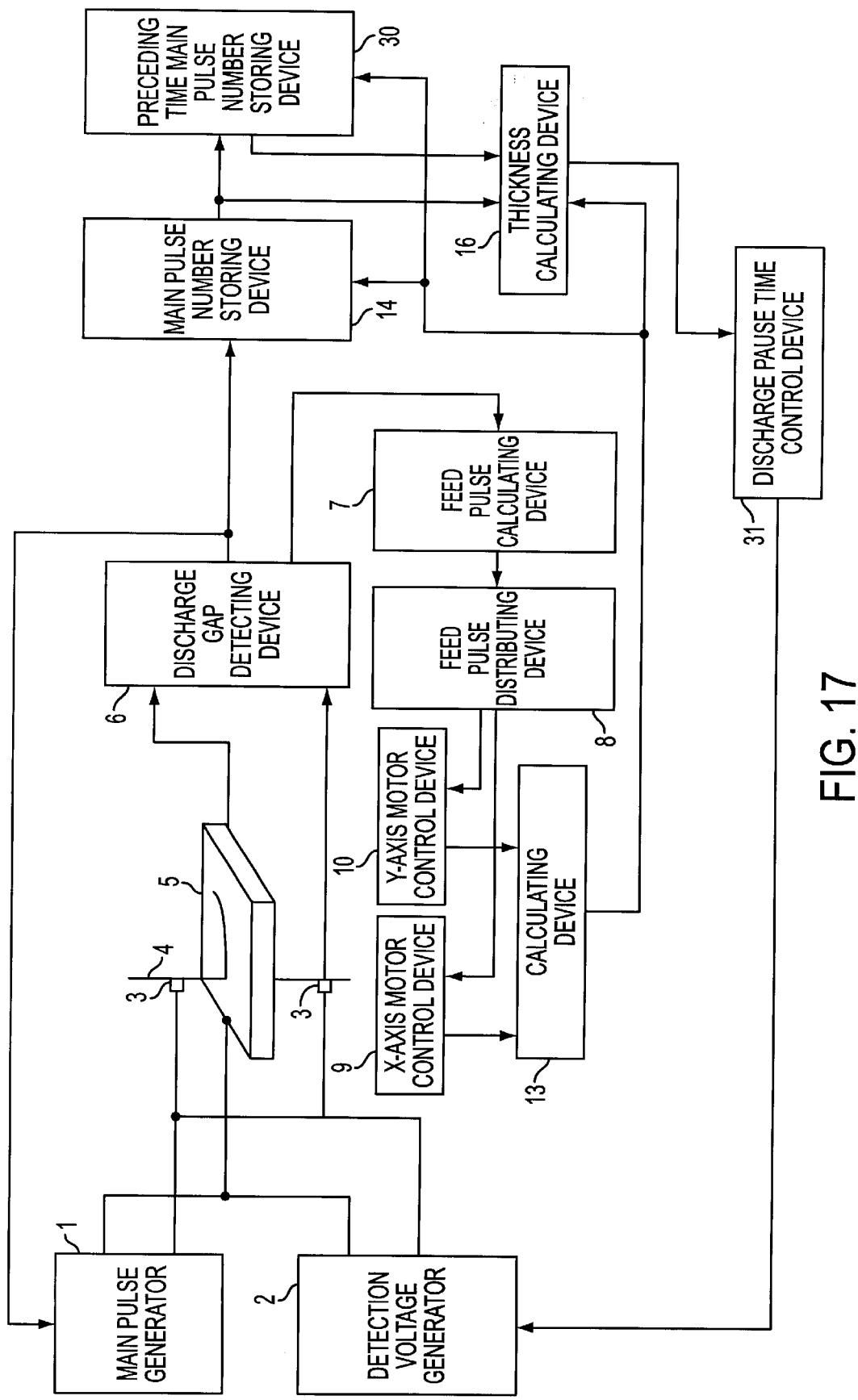
FIG. 17 is a constitution diagram of an eighth embodiment according to the invention.

FIG. 17 is a constitution diagram of an eighth embodiment of the invention. In the above-described fourth to seventh embodiments, the plate thickness change rate β in respect of the reference plate thickness H(s) is calculated and by the discharge pause time period, the discharge pulse current peak value or the discharge pulse current pulse width in respect of machining of the reference plate thickness H(s) and the plate thickness change rate β, the discharge pause time period, the discharge pulse current peak value or the discharge pulse current pulse width are controlled such that the machining current density remains unchanged. According to the eighth embodiment, at each machining of the set machining distance Δx, the plate thickness change rate β of plate thickness during machining of Δx a preceding time to plate thickness during machining of Δx at current time, is calculated and the discharge pause time period Toff during machining of the set machining distance Δx at the preceding time is multiplied by the reciprocal number of the plate thickness change rate β to thereby calculate new discharge pause time period.

That is, as shown by Equation (15), when the pause time period Toff(n) before change of plate thickness is multiplied by the reciprocal number of the plate thickness change rate β, constant machining in which the machining current density remains unchanged is provided after the change of plate thickness.

Hence, according to the eighth embodiment, in comparison with the fourth embodiment, in place of the reference main pulse number storing device 15 according to the fourth embodiment, a preceding time main pulse number storing device 30 is installed which is a point of difference, other constitution remains the same and accordingly, the same constituent elements are attached with notations the same as those of FIG. 13. At each progress of machining of the set machining distance Δx, by a signal outputted from the machining distance calculating device 13, the main pulse number (number of times of discharge) P(n+1) counted by the main pulse number storing device 14 during a time period of machining the set machining distance Δx and the main pulse number P(n) generated during a time period of the machining distance Δx at the preceding time which is stored to the previous time main pulse number storing device 30, are inputted to the plate thickness calculating device 16 and the previous time main pulse number storing device 30 inputs and stores the main pulse number P(n+1) counted by the main pulse number storing device 14. Further, the plate thickness calculating device 16 calculates the plate thickness change rate β=P(n+1)/P(n) (=H(n+1)/H(n)) by the main pulse number P(n) at the preceding time and the main pulse number P(n+1) at the current time and outputs it to the discharge pause time control device 31 as machining condition adjusting means. The discharge pause time control device 31 multiplied the pause time period Toff(n) in machining the set machining distance Δx at the preceding time by the reciprocal number of the plate thickness change rate β to thereby calculate new pause time period Toff(n+1) as shown by Equation (15) and outputs it to the detection voltage generator 2. (Incidentally, while, according to the fourth embodiment of FIG. 13, the pause time period Toff in respect of the reference plate thickness is multiplied by the reciprocal number of the plate thickness change rate β to thereby calculate pause time period, according to the fifth embodiment, the pause time period which has been outputted until then is multiplied by the reciprocal number of the plate thickness change rate to thereby calculate and update pause time period which is the point of difference between the discharge pause time control device 17 according to the fourth embodiment and a discharge pause time control device 31 according to the eighth embodiment.) The detection voltage generator 2 sets the pause time period Toff(n+1) to pause time period in a cycle of applying detection voltage to the gap between the workpiece 5 and the wire electrode 4.

Ninth Embodiment

Figure 18:
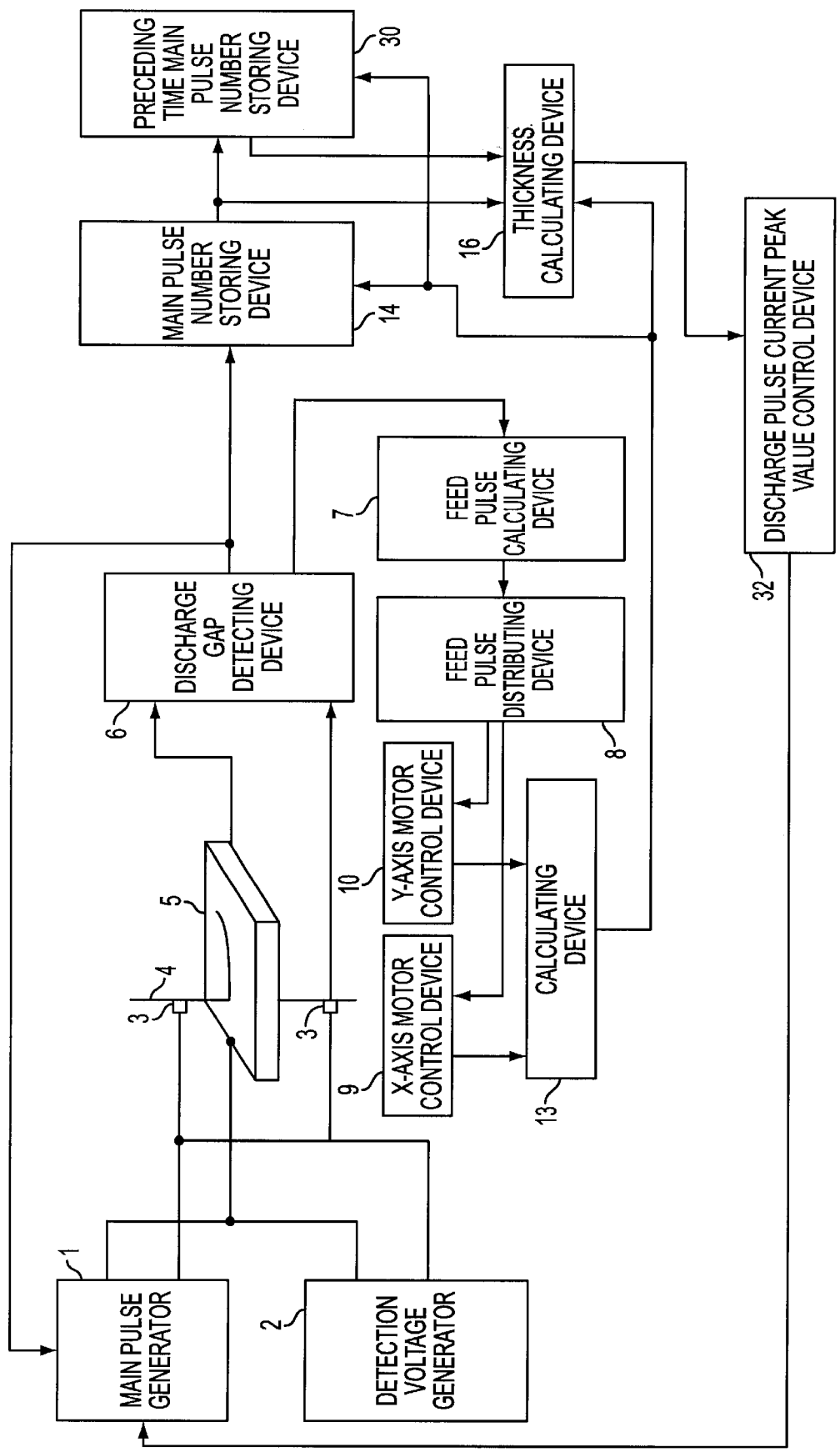
FIG. 18 is a constitution diagram of a ninth embodiment according to the invention.

FIG. 18 is a constitution diagram of a ninth embodiment of the invention. The ninth embodiment of FIG. 18 differs from the eighth embodiment of FIG. 17 in that a discharge pulse current peak value control device 32 is installed in place of the discharge pause time control device 31 as machining condition adjusting means and a peak value of discharge pulse current calculated by the device 32 is outputted to the main pulse generator 1. The other constitution remains the same as that of the eighth embodiment of FIG. 17 and accordingly, the same constituent elements are attached with the same notations.

Based on the plate thickness change rate β calculated by the plate thickness calculating device 16, as shown by Equation (17), a value of the current peak value Ip(n) of discharge pulse outputted during a time period of machining Δx at the preceding time multiplied by the plate thickness change rate β is outputted to the main pulse generator 1 as the current peak value Ip(n+1) and in successive machining of the machining distance βx, the machining is carried out by discharge current of the current peak value Ip(n+1).

According to the ninth embodiment, a change in the plate thickness is detected by the plate thickness calculating device 16 and the current peak value of discharge pulse is changed based on the plate thickness change rate β and accordingly, a successive plate thickness change rate is calculated by the plate thickness calculating device 16 by numbers of main pulse numbers in machining the machining distance Δx before and after a change of the current peak value. An energy amount per shot of main pulse (discharge pulse) differs and accordingly, an amount of machining per shot differs and accordingly, the accurate plate thickness change rate cannot be calculated. Therefore, when the plate thickness is changed rapidly, there causes a phenomenon in which current peak values after the change of plate thickness are oscillated and the machining accuracy is more or less deteriorated in comparison with those of other embodiments. However, when the plate thickness gradually changes, even by machining according to the ninth embodiment, the current peak value is controlled sufficiently in correspondence with the change in the plate thickness and the machining speed can be promoted and a dispersion in the machining enlargement amount can be dispensed with.

In place of the discharge pulse current peak value control device 32 of the ninth embodiment, a discharge pulse current pulse width control device may be used and the pulse width of main pulse outputted from the main pulse generator may be controlled as in the seventh embodiment shown by FIG. 16.

Tenth Embodiment

Figure 19:
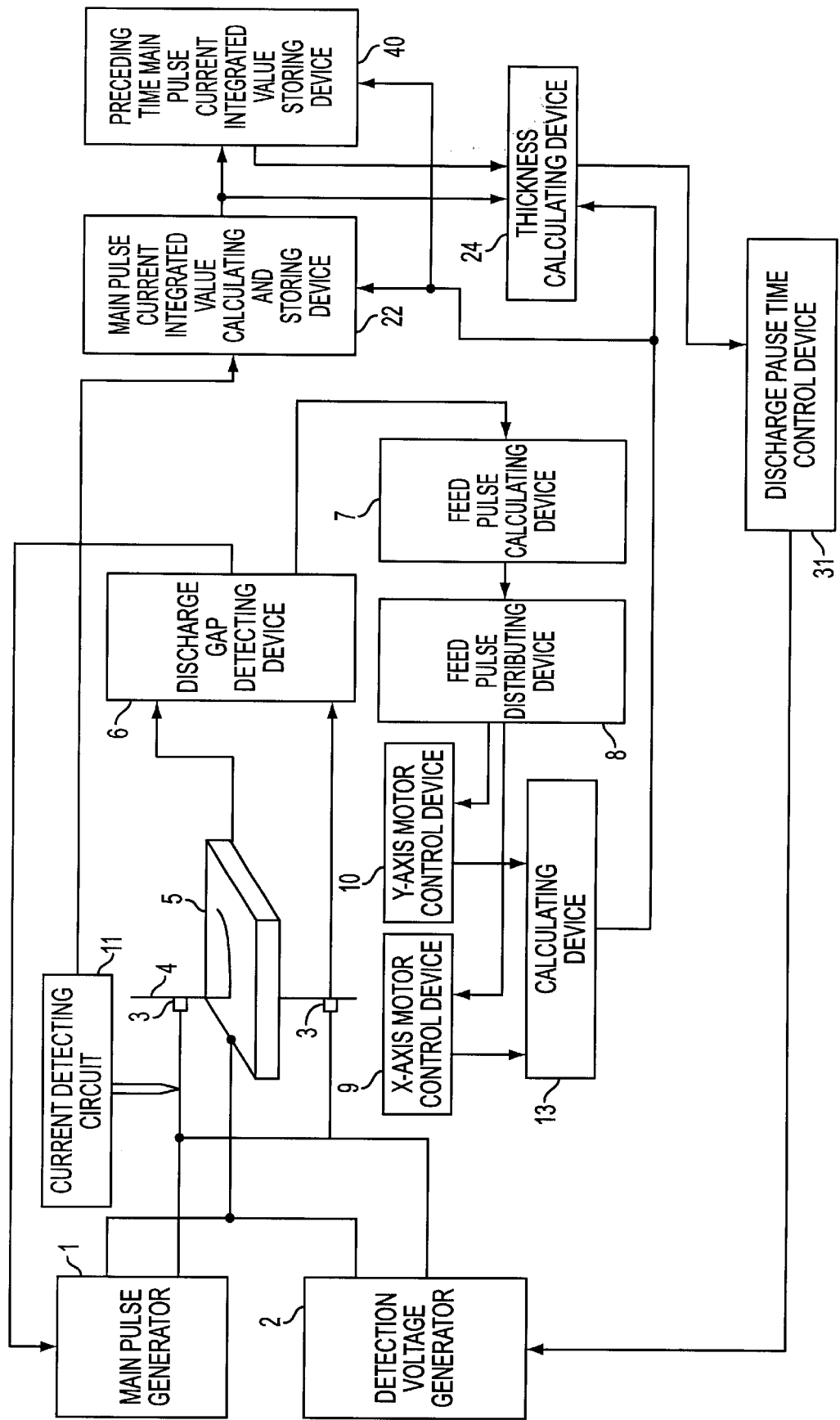
FIG. 19 is a constitution diagram of a tenth embodiment according to the invention.

FIG. 19 is a constitution diagram of a tenth embodiment of the invention. According to the tenth embodiment, similar to the fifth embodiment shown by FIG. 14, the discharge pause time period is controlled by the plate thickness and portions having constitutions the same as those of the embodiment shown by FIG. 14 are attached with the same notations. What differs therefrom resides in that in the plate thickness change detecting means, the change in the plate thickness is not calculated based on the reference main pulse current integrated value but by a change in the main pulse current integrated value before and after each progress of machining of Δx. For that purpose, in place of the reference main pulse current integrated value storing device of FIG. 14, a preceding time main pulse current integrated value storing device 40 is installed, further, there is used the discharge pause time control device 31 which calculates discharge pause time period by multiplying the discharge pause time period in machining the set distance Δx at the preceding time by the reciprocal number of the plate thickness change rate.

The machining distance calculating device 13 outputs a signal at each progress of machining of the set machining distance Δx. The main pulse current integrated value calculating and storing device 22 calculates an integrated value of discharge current (main pulse current) detected by the current detecting circuit during a time period of outputting the signal. When a signal is outputted from the machining distance calculating device 13, the main pulse current integrated value P(n) and P(n+1) stored to the main pulse current integrated value calculating and storing device 22 and the preceding time main pulse current integrated value storing device 40, are outputted to the plate thickness calculating device 24 and the integrated value P(n+1) stored to the main pulse current integrated value calculating and storing device 22 is stored to the preceding time main pulse current integrated value storing device 40.

The plate thickness calculating device 24 calculates the plate thickness change rate β (=P(n+1)/P(n)) by dividing the integrated value P(n+1) outputted from the main pulse current integrated value calculating and storing device 22 by the integrated value P(n) outputted from the preceding time main pulse current integrated value storing device 40. Based on the plate thickness change rate β, the discharge pause time control device 31 calculates the pause time period Toff(n+1) optimum to the plate thickness of the workpiece 5 during the machining by multiplying the discharge pause time period Toff(n) which has been outputted until then by the reciprocal number of the plate thickness change rate β and outputs it to the detection voltage generator 2.

The detection voltage generator 2 uses the pause time period Toff(n+1) from a successive discharge cycle.

Eleventh Embodiment

Figure 20:
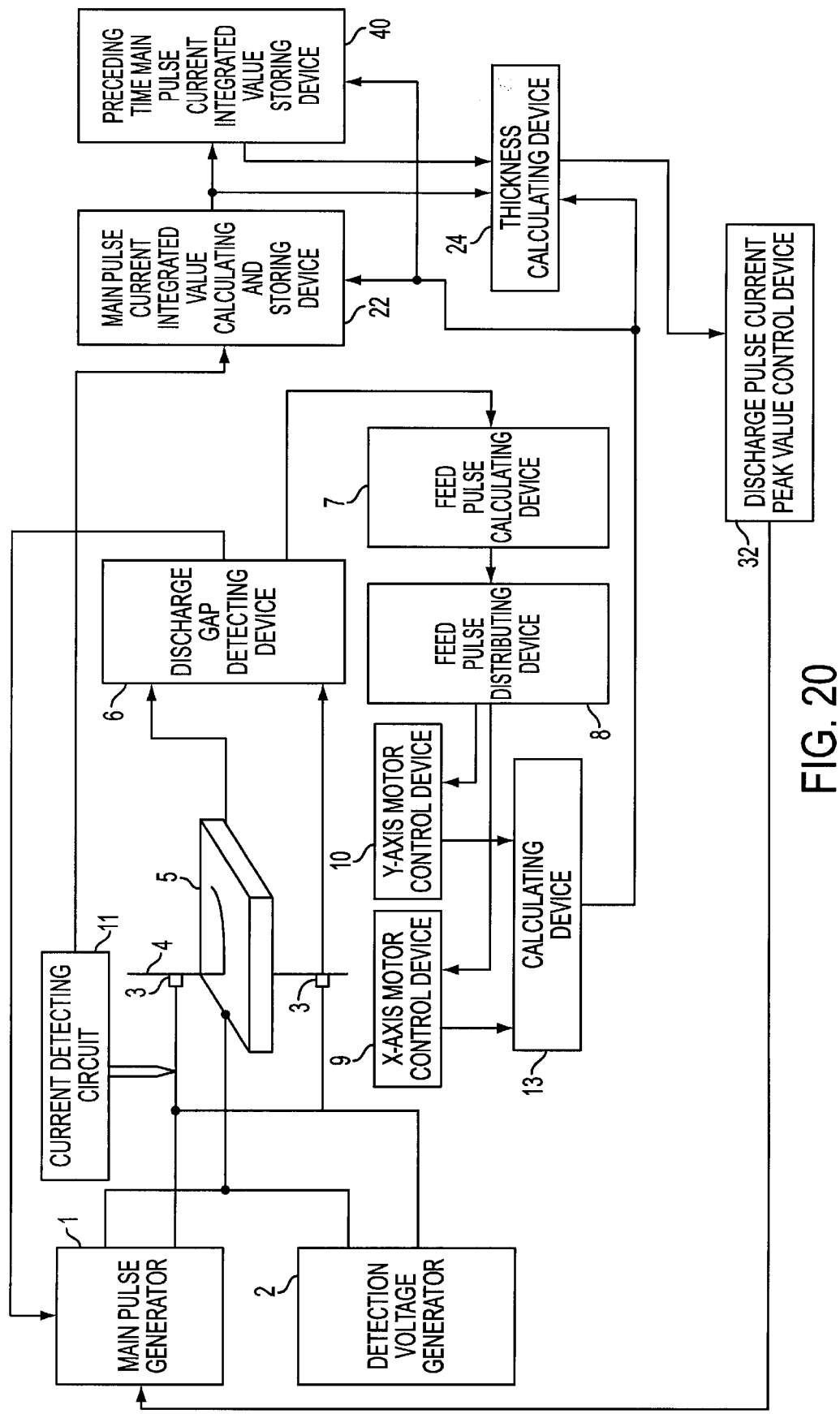
FIG. 20 is a constitution diagram of an eleventh embodiment according to the invention.

FIG. 20 is a constitution diagram of an eleventh embodiment of the invention. According to the eleventh embodiment, the plate thickness change rate is calculated by a change in the main pulse current integrated value during a time period of machining the set distance Δx and a peak value of the discharge pulse current is changed in proportion to the calculated plate thickness change rate to thereby provide machining in which the machining current density stays constant. What differs from the tenth embodiment of FIG. 19 resides in that as machining condition adjusting means, in place of the discharge pause time control device 31 according to the tenth embodiment, the discharge pulse current peak value control device 32 is installed and an output from the discharge pulse current peak value control device 32 is inputted to the main pulse generator 1 and other constitution remains the same as that of the tenth embodiment.

That is, according to the eleventh embodiment, at each machining of the machining movement distance Δx, the plate thickness change rate β (=P(n+1)/P(n)) is calculated by the plate thickness calculating device 24 from the main pulse current integrated value P(n) summed up during machining of Δx at the preceding time and main pulse current integrated value P(n+1) during machining of Δx at the current time and a value produced by multiplying the discharge pulse current peak value IP which has been outputted until then by the calculated plate thickness change rate β, 73 updated discharge pulse current peak value IP.

Further, in the eighth embodiment, in place of the discharge pulse current peak value control device 32, a discharge pulse current pulse width control device may be installed and by controlling the pulse width of the main pulse current, the control may be carried out such that the machining current density is maintained constant.

Figure 25:
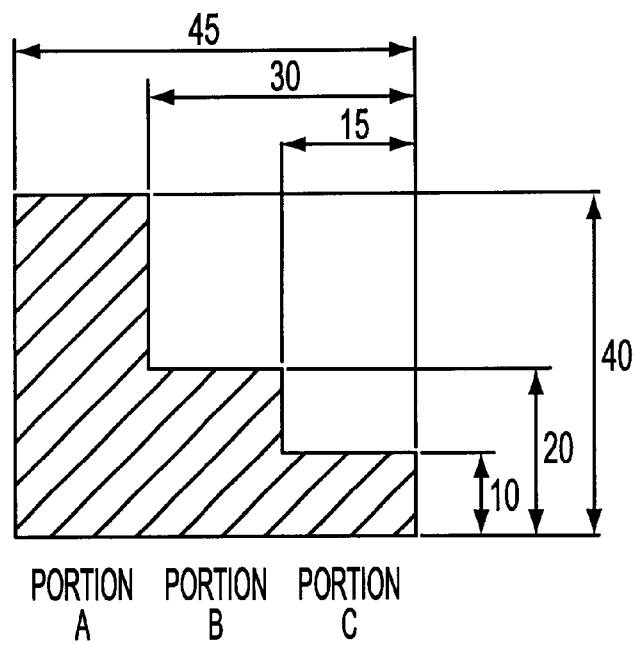
FIG. 25 is a sectional view of a workpiece for machining to observe an effect of the invention.
Figures 26, 27:
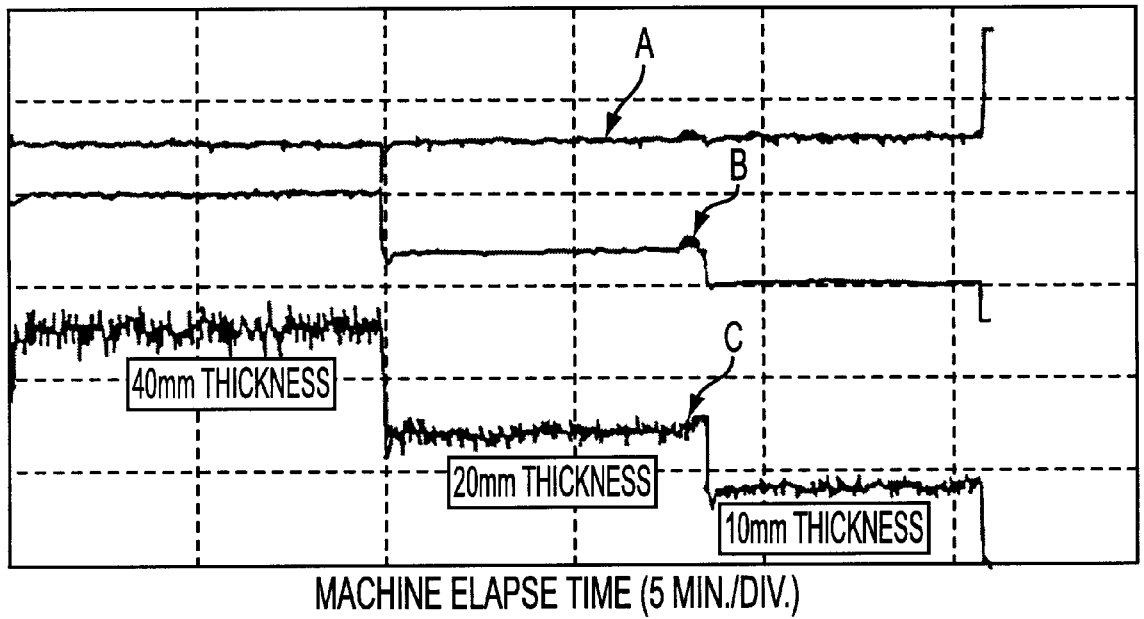
FIG. 26 is a monitor diagram when the workpiece shown by FIG. 25 is machined by the first embodiment of the invention.
FIG. 27 is a diagram showing a result of measuring a groove width when the workpiece shown by FIG. 25 is machined by a conventional electric discharge machining controller and machined by the fourth embodiment of the invention.

FIG. 26 is a diagram of monitor waveforms when a workpiece shown by FIG. 25 in which the plate thickness is changed to 40 mm, 20 mm and 10 mm is machined by carrying out current control according to the fourth embodiment mentioned above. As is known from FIG. 26, although the machining average voltage is maintained constant even when the plate thickness is changed, the machining average current is changed with a change in the plate thickness and the machining current density is maintained constant.

Further, FIG. 27 is a diagram showing a result of measurement of machined groove widths when the workpiece of FIG. 25 is machined by the conventional machining method and the machining method by current control by detecting the plate thickness according to the invention (Fourth Embodiment). As is known from FIG. 27, according to the conventional method, the thinner the plate thickness, the larger becomes the groove width and a difference between the groove widths between the case of the plate thickness 40 mm and the case of the plate thickness 10 mm is 0.015 mm. Meanwhile, when the invention is applied, the groove width stays substantially constant even with the change in the plate thickness, causing an error of only 0.001 mm.

Further, other than the embodiments as machining condition adjusting means mentioned above, an energy amount inputted from the main pulse generator may be adjusted by adjusting the no load machining time period Tw by adjusting the set voltage in servo feed control by the plate thickness change rate. In this case, although accuracy is more or less deteriorated by presence of secondary discharge since energy is not adjusted directly, the target of preventing wire disconnection can be achieved. That is, in servo control in which feedback control is carried out such that the average machining voltage of the gap between the wire electrode and the workpiece coincides with set voltage, the set voltage is equal to the average machining voltage Vm. Further, the average machining voltage Vm is represented by the following equation.

$$Vm(n)=V=Tw(n)/(Tw(n)+Toff)$$

In the above-described equation, Vm(n) designates the average machining voltage, Tw(n) designates the no load machining time period and Toff designates no load peak voltage which is made constant.

From the above-described equation, it is signified that the larger the average machining voltage Vm(n), the larger the no load machining time period Tw(n). That is, the average machining voltage Vm(n) and the no load machining time period Tw(n) are in a certain proportional relationship. As a result, the no load machining time period Tw(n) can be adjusted by adjusting the set voltage since the set voltage of servo feed control and the average machining voltage Vm(n) are equal to each other, as a result, the current density can be controlled by adjusting the energy amount inputted from the main pulse generator.

As an example, set voltage in correspondence with the plate thickness change rate in respect of reference plate thickness is previously determined by an evaluation function or a table and in the actual machining operation, the set voltage is changed in correspondence with the plate thickness change rate and the average machining voltage of the gap is adjusted by which the no load machining time period Tw is adjusted and the current density is adjusted. That is, in respect of a reduction in the plate thickness, by setting high set voltage, the no load machining time period Tw is increased and the pause time period of the main pulse energy is prolonged. Thus, the current density is lowered to be maintained appropriately. In respect of an increase in plate thickness, by setting low set voltage, the no load machining time period Tw is reduced and the pause time period of the main pulse energy is shortened. Thus, the current density is increased to be maintained appropriately.

Further, in servo feed control, feed speed of the wire electrode in respect of the workpiece is controlled by feedback control such that the set voltage and the average machining voltage coincide with each other and the feed speed is determined in accordance with a deviation between the set voltage and the average machining voltage. Hence, the feed speed in the case of steady-state deviation can be changed by changing gain for calculating the feed speed in accordance with the deviation between the set voltage and the average machining voltage, that is, the feedback gain in servo feed control. When the feed speed is changed, the no load machining time period Tw is changed, the pause time period of the main pulse energy can be adjusted and the current density can be adjusted.

As an example, the feedback gain of servo feed in correspondence with the plate thickness change rate is previously determined by an evaluation function or a table and in the actual machining operation, the current density is adjusted by adjusting the average machining voltage of the gap by adjusting the above-described gain in correspondence with the plate thickness change rate. That is, in respect of a reduction in the plate thickness, the gain is reduced and the feed speed is retarded by which the no load machining time period Tw is increased and the pause time period of the main pulse energy is prolonged. Further, the current density is maintained to lower. In respect of an increase in the plate thickness, the gain is increased and the feed speed is accelerated by which the no load machining time period Tw is reduced and the pause time period of the main pulse energy is shortened. Further, the current density is increased to be maintained appropriately.

Further, when the machining is controlled not by the servo feed control but by feed speed instructed by a program, the instructed feed speed may be adjusted in accordance with the plate thickness change rate. For example, discharge machining is carried out initially at a feed speed instructed by a program, the plate thickness change rate is calculated and feed speed which has been instructed until then (initially, feed speed instructed by a program) is multiplied by the calculated plate thickness change rate to thereby constitute new feed speed by which the feed speed is changed in accordance with a change in the plate thickness. For example, when the plate thickness is increased and the plate thickness change rate exceeds "1", the feed speed is increased, the no load machining time period Tw is reduced, the pause time period the main pulse energy is shortened, and the current density is increased to be maintained appropriately. Further, when the plate thickness is reduced and the plate thickness change rate becomes smaller than "1", new feed speed is retarded, the no load machining time period Tw is increased and pause time period of the impulse energy is prolonged to maintain the appropriate current density.

According to the invention, the plate thickness or the current density is detected and displayed and accordingly, a change in the plate thickness can immediately be known and the machining condition can be adjusted. Thereby, wire disconnection in changing the plate thickness can be prevented. Further, the machining condition can be grasped in real time by displaying the feed speed and the machining current other than the plate thickness.

Further, the plate thickness is detected in real time, the machining condition is changed automatically and the machining current density is prevented from being changed and therefore, wire disconnection in changing the plate thickness can be prevented. The machining condition can automatically be changed to an optimum condition in accordance with the plate thickness even when the plate thickness is changed and accordingly, the machining enlargement amount can significantly be made small. Further, the machining is carried out under an optimum machining condition automatically in accordance with the plate thickness and accordingly, in machining the workpiece, the machining condition is not fixed to an optimum machining condition at a thin portion of the plate thickness as in the conventional case and accordingly, the machining speed can considerably be shortened.

What is claimed is:

1. A controller of a wire electric discharge machine, comprising:
   a thickness detecting device periodically detecting thickness of a workpiece during a machining operation;
   a determining device periodically determining a change of the thickness of the workpiece based on a change of a discharge energy during the machining operation;
   an altering device altering a machining condition in accordance with the change of the thickness of the workpiece; and
   a display control device displaying a relationship between a movement distance or a machining time on a machining path and the thickness of the workpiece on a display device.

2. A controller of a wire electric discharge machine according to claim 1, further comprising a second detecting device detecting at least one of a machining current, a machining speed and a machining current density in respect of machining face of the workpiece during the machining operation, wherein said display control device displays a relationship between the movement distance of the machining time on the machining path and at least one of the detected machining current, the detected machining speed and the detected machining current density on said display device.

3. A controller of a wire electric discharge machine according to claim 1, wherein the relationship is displayed on a graph with the movement distance or the machining time on the machining path as an abscissa.

4. A controller of a wire electric discharge machine according to claim 1, wherein said thickness detecting device calculates a change rate of the thickness of the workpiece based on a ratio of an inputted energy when the workpiece is machined by a predetermined distance to a reference inputted energy when a reference workpiece having a predetermined thickness is machined by the predetermined distance and calculates the thickness of the workpiece based on the change rate the thickness of the reference workpiece.

5. A controller of a wire electric discharge machine according to claim 4, wherein the ratio between the inputted energies is calculated by a ratio between a number of main pulses for carrying out the discharge machining operation.

6. A controller of a wire electric discharge machine according to claim 4, wherein the ratio between the inputted energies is calculated by a ratio between summed values of discharge machining currents.

7. A controller of a wire electric discharge machine, comprising:
   a current density detector detecting a machining current density on a machining face of a workpiece during a machining operation; and
   a display controller displaying a relationship between a movement distance or a machining time on a machining path and the detected machining current density on a display device.

8. A controller of a wire electric discharge machine according to claim 7, wherein the relationship is displayed on a graph with the movement distance or the machining time on the machining path as an abscissa.

9. A controller of a wire electric discharge machine according to claim 7, wherein said current density detector calculates the machining current density based on thickness of the workpiece and a machining current during the machining operation.

10. A controller of a wire electric discharge machine according to claim 9, wherein said current density detector calculates a change rate of the thickness of the workpiece based on a ratio of an inputted energy when the workpiece is machined by a predetermined distance to a reference inputted energy when a reference workpiece having a predetermined thickness is machined by the predetermined distance and calculates the thickness of the workpiece based on the change rate and the thickness of the reference workpiece.

11. A controller of a wire electric discharge machine according to claim 10, wherein the ratio between the inputted energies is calculated by a ratio between a number of main pulses for carrying out the discharge machining.

12. A controller of a wire electric discharge machine according to claim 10, wherein the ratio between the inputted energies is calculated by a ratio between summed values of the discharge machining currents.

13. A controller of a wire electric discharge machine, comprising:
   a discharge current generator for supplying a pulsating current to a discharge gap between a wire electrode and a workpiece;

a machining distance calculator calculating a machining distance;

a thickness change detector calculating a thickness change rate of the workpiece based on an energy amount inputted from said discharge current generator during machining by the predetermined distance; and a machining condition adjustor adjusting the energy amount inputted from the discharge current generator based on the calculated thickness change rate so that a machining current density is substantially maintained.

14. A wire electric discharge machine according to claim 13, wherein said thickness change detector calculates the thickness change rate based on a set reference energy amount and the energy amount inputted from said discharge current generator during machining by the predetermined distance in the machining operation.

15. A wire electric discharge machine according to claim 13, wherein said thickness change detecting means comprises:

a summing unit summing and storing the energy amount inputted from the discharge current generator during machining of the predetermined distance; and a storing unit storing the summed energy amount in machining the predetermined distance at a preceding time,
wherein the thickness change rate of the workpiece is calculated by the summed energy amounts at the preceding time and at a current time at each progress of the machining by the predetermined distance.

16. A wire electric discharge machine according to claim 13, wherein said thickness change detector calculates the thickness change rate with a pulse number inputted from said discharge current generator as the energy amount.

17. A controller of a wire electric discharge machine according to claim 13, wherein said thickness change detector calculates the thickness change rate with an integrated value of a pulsating current inputted from said discharge current generator as the energy amount.

18. A controller of a wire electric discharge machine according to claim 13, wherein said machining condition adjuster adjusts the energy amount inputted from said discharge current generator by adjusting a length of a machining pause time in which application of a voltage to the gap between the wire electrode and the workpiece pauses based on the thickness change rate.

19. A controller of a wire electric discharge machine according to claim 13, wherein said machining condition adjustor adjusts the energy amount inputted from said discharge current generator by adjusting a peak value of the pulsating current based on the thickness change rate.

20. A controller of a wire electric discharge machine according to claim 13, wherein said machining condition adjustor adjusts the energy amount inputted from said discharge current generator by adjusting a pulse width of the pulsating current based on the thickness change rate.

21. A controller of a wire electric discharge machine according to claim 13, wherein said machining condition adjustor adjusts the energy amount inputted form said discharge current generator by adjusting a set voltage in a servo feed control for carrying out a feedback control such that an average machining voltage at the gap between the wire electrode and the workpiece coincides with the set voltage, based on the thickness change rate.

22. A controller of a wire electric discharge machine according to claim 13, wherein said machining condition adjustor adjusts the energy amount inputted from said discharge current generator by adjusting a feedback gain in a servo feed control for carrying out a feedback control such that an average machining voltage at the gap between the wire electrode and the workpiece coincides with the set voltage, based on the thickness change rate.

23. A controller of a wire electric discharge machine according to claim 13, wherein said machining condition adjustor adjusts the energy amount inputted form said discharge current generator by adjusting a relative feed speed of the wire electrode with respect to the workpiece based on the thickness change rate.

24. A controller of a wire electric machine, comprising:

a reference determining device determining a number of reference discharge pulses required for machining a workpiece of a predetermined thickness by a predetermined distance;

a discharge pulse number determining device determining the number of discharge pulses generated in machining the workpiece by the predetermined distance during a machining operation;

a ratio determining device periodically determining a ratio between the number of reference discharge pulses and the number of discharge pulses, and a change of the thickness of the workpiece based on said ratio during the machining operation;

an altering device altering a machining condition in accordance with the change of the thickness of the workpiece during the machining operation; and a display control device displaying a relationship between a movement distance or a machining time on a machining path and the thickness of the workpiece on a display device.

* * * * *

UNITED STATES PATENT AND TRADEMARK OFFICE
CERTIFICATE OF CORRECTION

PATENT NO. : 6,278,075 B1
DATED : August 21, 2001
INVENTOR(S) : Masao Kamiguchi et al.

It is certified that error appears in the above-identified patent and that said Letters Patent is hereby corrected as shown below:

<u>Title page,</u>
Item [56], References Cited: FOREIGN PATENT DOCUMENTS
Change "60-073326" to -- 60-073326A --
Change "62-237335" to -- 62-237335A --
Change "05149811" to -- 0514988A --

<u>Column 11,</u>
Line 13, change "Tn" to -- tn --.

<u>Column 23,</u>
Line 47, change "βx" to -- Δx --.

<u>Column 26,</u>
In the equation, change "=" (second occurrence) to -- X --.

Signed and Sealed this

Sixteenth Day of April, 2002

Attest:

JAMES E. ROGAN
*Attesting Officer*  *Director of the United States Patent and Trademark Office*